(12) United States Patent
Hori et al.

(10) Patent No.: US 6,616,559 B1
(45) Date of Patent: Sep. 9, 2003

(54) CONTINUOUSLY VARIABLE TRANSMISSION

(75) Inventors: Yasuhiko Hori, Osaka (JP); Junichi Hitachi, Osaka (JP); Yukio Kubota, Osaka (JP); Kunihiko Sakamoto, Osaka (JP)

(73) Assignee: Yanmar Co., Ltd. (JP)

( * ) Notice: Subject to any disclaimer, the term of this patent is extended or adjusted under 35 U.S.C. 154(b) by 0 days.

(21) Appl. No.: 09/830,293

(22) PCT Filed: Oct. 25, 1999

(86) PCT No.: PCT/JP99/05886

§ 371 (c)(1),
(2), (4) Date: Jul. 25, 2001

(87) PCT Pub. No.: WO00/25041

PCT Pub. Date: May 4, 2000

(30) Foreign Application Priority Data

| Oct. 26, 1998 | (JP) | ........................... 10-304545 |
| Oct. 27, 1998 | (JP) | ........................... 10-306078 |
| Oct. 27, 1998 | (JP) | ........................... 10-306079 |
| Oct. 27, 1998 | (JP) | ........................... 10-306080 |
| Oct. 27, 1998 | (JP) | ........................... 10-306081 |
| Oct. 27, 1998 | (JP) | ........................... 10-306082 |
| Oct. 27, 1998 | (JP) | ........................... 10-306083 |
| Oct. 27, 1998 | (JP) | ........................... 10-306084 |
| Oct. 27, 1998 | (JP) | ........................... 10-306085 |
| Oct. 27, 1998 | (JP) | ........................... 10-306086 |
| Oct. 27, 1998 | (JP) | ........................... 10-306087 |
| Oct. 27, 1998 | (JP) | ........................... 10-306088 |

(51) Int. Cl.$^7$ .......................... F16H 47/04; B62D 11/08
(52) U.S. Cl. .......................... 475/23; 475/27; 475/73; 475/74; 475/80; 475/218; 475/329
(58) Field of Search .......................... 475/19, 23, 27, 475/72, 73, 74, 76, 78, 80, 208, 209, 218, 257, 329

(56) References Cited

U.S. PATENT DOCUMENTS

| 4,354,400 A | * | 10/1982 | Baker ........................... 475/74 |
| 5,421,790 A | * | 6/1995 | Lasoen ........................... 475/78 |
| 5,529,546 A | * | 6/1996 | Ishino et al. ........................... 475/76 |
| 5,540,051 A | * | 7/1996 | Maruyama et al. ........................... 475/76 |
| 5,611,405 A | * | 3/1997 | Ishino et al. ........................... 475/19 X |
| 5,622,050 A | * | 4/1997 | Ishino et al. ........................... 475/76 |
| 5,667,452 A | * | 9/1997 | Coutant ........................... 475/72 |
| 6,007,444 A | * | 12/1999 | Kinokami ........................... 475/72 |
| 6,039,666 A | * | 3/2000 | Okuda et al. ........................... 475/72 |

FOREIGN PATENT DOCUMENTS

| DE | 4140979 | * | 6/1993 | ........................... 475/72 |
| JP | 355094054 | * | 7/1980 | ........................... 475/72 |

* cited by examiner

*Primary Examiner*—Rodney H. Bonck
*Assistant Examiner*—Ha Ho
(74) *Attorney, Agent, or Firm*—Sterne, Kessler, Goldstein & Fox P.L.L.C.

(57) ABSTRACT

A hydraulic and mechanical composite continuously variable transmission (HMT) is disclosed. The HMT includes a hydraulic continuously variable transmission (HST) and a mechanical speed change mechanism using a group of planetary gears as the differential part. The output rotation of the HST and the rotation of the input part of the mechanical speed change mechanism that receives power from the engine are transmitted to the differential part which translates the rotation to a speed change output shaft. The speed change input part is formed at one end of a pump shaft and the differential input part is coaxially formed at the other end thereof. Further, the operator may manually set the speed ratio via electrical means on the mechanical speed chance mechanism.

31 Claims, 23 Drawing Sheets

| Speed Ratio Setting Position | RM·RL·FL | FM·FH |
|---|---|---|
| Transmission mode | HST mode | HMT mode |
| Clutch 11 | OFF | ON |
| Clutch 12 | ON | OFF |

| Speed Ratio Setting Position | RM・RL・FL | FM・FH | Fmax |
|---|---|---|---|
| Transmission mode | HST mode | HMT mode | Mechanical drive mode |
| Clutch 11 | OFF | ON | OFF |
| Clutch 12 | ON | OFF | OFF |
| Clutch 13 | OFF | OFF | ON |

Fig.16
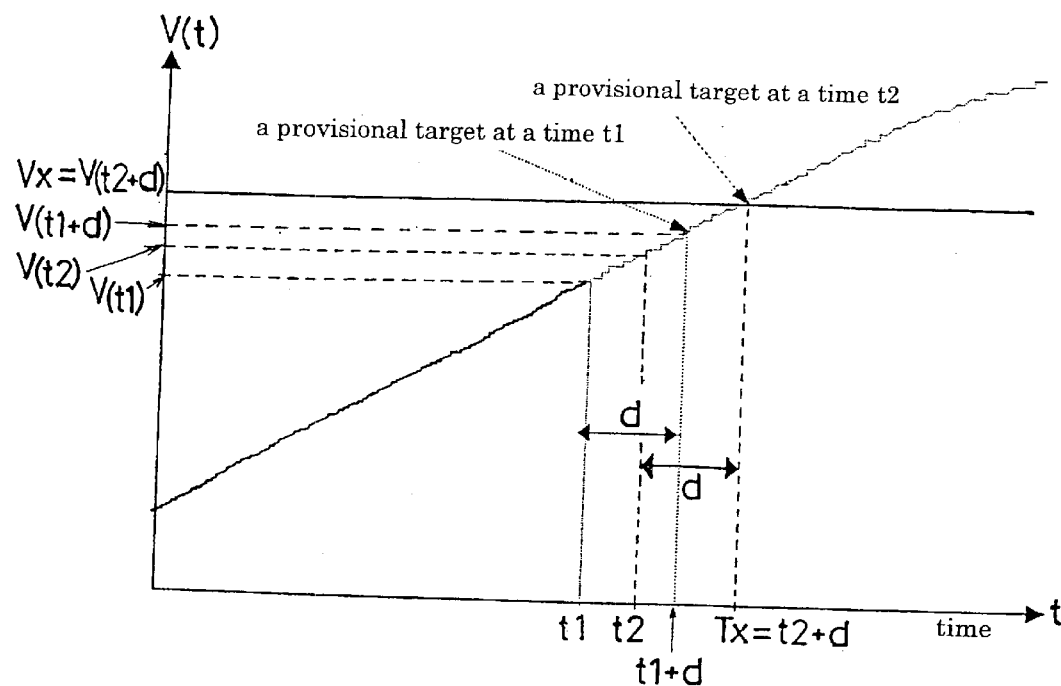
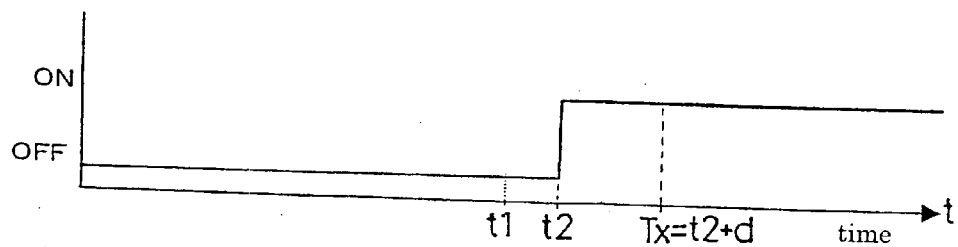
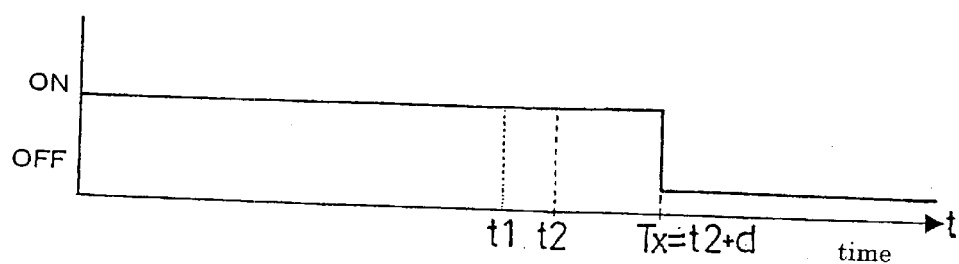

CONTINUOUSLY VARIABLE TRANSMISSION

RELATED APPLICATION

This is a U.S. National Phase of International Application No. PCT/JP99/05886, International Filing Date: Oct. 25, 1999, that published under PCT Article 21(2) in a language other than English.

TECHNICAL FIELD

The present invention relates to a continuously variable transmission having a hydraulic continuously variable transmission (hereinafter referred to as an "HST"). Especially, it relates to a hydraulic and mechanical composite transmission (hereinafter referred to as an "HMT") as a combination of an HST and a mechanical speed change mechanism having a differential part as a planetary gearing, wherein the mechanical speed change mechanism is constructed such that the output rotation of the HST and the rotation of its input part receiving engine power are transmitted into the differential part, and then, the differential rotation of the differential part is transmitted to a speed change output shaft part thereof. Further especially, it relates to that have the mechanical speed change mechanism provided with setting means which can electrically set a rotational speed ratio of the speed change output shaft part to the speed change input shaft part. This ratio is referred to as a speed ratio.

BACKGROUND ART

Conventionally, there is a well-known HMT as a combination of an HST and a mechanical speed change mechanism, wherein the mechanical speed change mechanism is constructed such that the rotational force of an input part thereof for receiving engine power (a speed change input part) and the output rotational force of the HST are transmitted to a differential part thereof having a group of planetary gears and the differential rotation of the group of planetary gears in the differential part is transmitted to a speed change output part thereof.

In the conventional HMT, the input part of the differential part for receiving engine power is constructed separately from a pump shaft of the HST. Referring to the above art, an input shaft for the whole HMT serves as a rotational axis of the differential part. However, power from the differential part is transmitted to a pump shaft of the HST through a gear train, thereby detracting efficiency of transmission. Furthermore, the pump part of the HST cannot be disposed coaxially to the differential part, thereby inhibiting minimization of the HMT. Furthermore, as well-known from U.S. Pat. No. 4,259,881, the differential part is radially expanded because it includes a ring gear having an inner peripheral gear, thereby also inhibiting minimization of the HMT.

In the conventional HMT, as well-known, power can be selectively transmitted to the output part thereof from either a motor shaft of the HST (hereinafter, such a transmission mode is referred to as an "HST mode") or the differential part (hereinafter, such a transmission mode is referred to as an "HMT mode"). For transmission of engine power to the output part with the least loss, it is desirable that a gear is interposed between the input part and the output part in the HMT so as to transmit power without the HST and the differential part. In other words, the power transmission with such a gear train may be selected during a high-speed traveling or so on. However, such a gear train is not provided in the conventional HMTs. Of course, there is no control system for selecting the transmission with such a gear train.

As for control of the HMT, an electromagnetic clutch is conventionally used for changing a transmission mode between the HST mode and the HMT mode. A certain speed ratio is set for determining the timing of this mode change. However, in the conventional clutch during its disengagement, only one clutch side is rotated while the other is stationary. Thus, when the clutch is engaged, the stationary clutch side resists against the rotating clutch side, thereby not only changing the rotating speed suddenly but also stressing the abutting surfaces of the clutch greatly. Therefore, the conventional clutch is made of strong material such as sintered metal, which is expensive and enlarged so as to inhibit its minimization.

As for the change of transmission mode, if a lag in completing the operation of the electromagnetic clutch, that is caused by transmitting an electric output signal to the electromagnetic clutch and a time of actual operation of the electromagnetic clutch, is not considered, speed is suddenly changed because of a difference of output/input speed ratio between pre-operation and post-operation of the clutch. The above-mentioned conventional art does not consider adjustment of the output/input speed ratio, or the timing, for changing the transmission mode.

If a brake is provided on the output part, the braked output part resists against the transmission system from the differential part or the motor shaft of the HST, thereby damaging a clutch between the output part and the transmission system. The above-mentioned conventional art does not consider a relationship between the brake and the clutch.

The adjustment of the output/input speed ratio of the HMT depends upon the adjustment of the amount of oil discharged from the HST. In a composition of two variable displacement hydraulic units shown in U.S. Pat. No. 5,421,790, the actuations of both the hydraulic units are sequential. For example, when one hydraulic unit discharges, the other hydraulic unit is in neutral, i.e., the functions of both the hydraulic units as a hydraulic pump and a hydraulic motor are exchanged with each other in respective ranges of speed ratio. However, if speed ratio setting means is to be greatly shifted so as to greatly change the speed ratio, it takes a long time to change the speed reduction under such hydraulic control so that a vehicle is uncomfortably accelerated or decelerated. If both the hydraulic units were adjusted in their discharge simultaneously, a target speed ratio could be attained soon. However, if the speed ratio is varied across a point for changing the transmission mode, the clutch is greatly stressed under the situation where both the hydraulic units are actuated.

If load is applied, the output part is decelerated by the load so that the actual speed ratio becomes different from the set speed ratio. In this case, usually, an engine rotation is adjusted by a governor. The conventional HMT does not consider the speed ratio to be adjusted for amendment of output rotation. If the speed ratio is to be adjusted, a relation of actuation between both the hydraulic units constituting the HST must be considered. Furthermore, if the actual speed ratio is changed according to such variance of load while a speed ratio is set in the vicinity of the change point of transmission mode, the transmission mode is frequently alternated, thereby damaging the clutch and making the travel of a vehicle unstable.

Regarding a continuously variable transmission including an HST (whether it may be an HMT or constituted only by an HST), in the case where the speed ratio is controlled electrically, e.g., correspondingly to a voltage issued from a position sensor which detects a position of a lever for setting a speed ratio, it is assumed that the variance ratio of the speed ratio is constant in its whole range to be set. On this assumption, if the variance ratio is set in correspondence to a low speed range, the lever must be shifted to a considerably large degree for establishing a high speed. If the variance ratio is set in correspondence to a high speed range, the speed ratio is greatly varied in a low speed range while the lever is shifted to a small degree so that the low speed travel of a vehicle during a work or so on becomes unstable.

Furthermore, conventionally, such an electric speed ratio control system does not have control means for adjusting acceleration and deceleration in corresponding to the speed of shifting.

Conventionally, for setting the speed ratio to zero, the discharge of the variable displacement hydraulic unit of the HST is set to zero. However, hydraulic control for establishing a neutral condition is difficult. Even if oil extremely slightly escapes, a motor shaft is, so far from certainly stationary, moved. Especially, such a problem arises when a vehicle is stopped on a slope. For solving this problem, for example, biasing means for neutral returning is provided on capacity setting means of the HST. However, this structure is complicated and increases manufacturing costs. If the capacity setting means is electrically controlled, by contriving an electric control signal in neutral, the vehicle may be enabled to stop securely without complicating the capacity setting means.

Conventionally, there is a well-known governor for controlling engine rotation wherein a load regulation mode for varying the engine rotation in spite of setting an accelerator can be established according to detection of load on an engine so as to increase the resistance against the load during excessive loading, and to reduce engine noise during light loading. During the load regulation mode, it happens that the actual traveling speed is different from the speed set by the accelerator. For compensating the difference, it may be thought that the speed reduction of the HMT is adjusted. Conversely speaking, such a compensation enables the engine rotation to be regulated in the load regulation mode. However, the variance of engine rotation causes a variance of rotational speed of a PTO shaft, and a great variance of traveling speed in a middle-and-high speed range. Therefore, a situation must be limited.

Conventionally, the continuously variable transmission comprising an HST or so on, which can electrically control a speed ratio, is not constructed such that a left-and-right turning radius is varied according to the change of the set speed ratio in correspondence to the turning angle of a steering wheel so as to enable a vehicle to turn on a small circle.

DISCLOSURE OF THE INVENTION

An object of the present invention is to provide a continuously variable transmission having an HST (e.g., an HMT), which is improved so as to solve the above-mentioned problems.

First, to provide a compact HMT having high efficiency in its transmission of power from an engine, the present invention is so constructed as follows:

An HST and a mechanical speed change mechanism which includes a differential part constituted by a group of planetary gears are interposed between a speed change input part for receiving power from a prime mover and a speed change output part. The rotation of the speed change input part is transmitted to both a hydraulic pump of the HST and a first differential input part of the differential part. The differential part further includes a second differential input part for receiving the rotational force of a hydraulic motor of the HST. The rotation of the group of planetary gears generated by the difference of rotational speed between the first and second differential input parts can be transmitted to the speed change output part. In such a structure of the HMT, a pump shaft of the HST is formed on its one end side with the speed change input part, and on the other end side with the first differential input part coaxial with the speed change input part. The first differential input part may be structured by extending the pump shaft.

Furthermore, the first differential input part is provided with an outer-peripherally toothed first sun gear engaging with the group of planetary gears. The second differential input part is provided with an outer-peripherally toothed second sun gear freely rotatably disposed on a shaft of the first sun gear so as to engage with the group of planetary gears. Consequently, the differential part having no inner-peripherally toothed ring gear can be further minimized.

Still furthermore, a shaft serving as the first differential input part is extended so as to join a PTO shaft so that the parts between the speed change input part and the PTO shaft can be coaxially disposed, thereby enabling a compact transmission to be provided.

The mechanical speed change mechanism of the HMT is provided with first, second and third drive trains. The first drive train is interposed between the motor shaft and the second differential input part. The second drive train transmits the differential rotation of the group of planetary gears to the speed change output part. The third drive train transmits the rotation of the motor shaft to the speed change output part without passing the differential part. As for a transmission mode of the HMT, the HMT can be selectively placed into either a first transmission mode or a second transmission mode. In the first transmission mode, power is transmitted from the motor shaft to the speed change output part through the third drive train while the first drive train is isolated. In the second transmission mode, power is transmitted from the motor shaft to the speed change output part through the first drive train, the differential part and the second drive train while the third drive train is isolated. Referring to a ratio of rotational speed of the speed change output part to that of the speed change input part as a speed ratio, the hydraulic pump or the hydraulic motor is adjusted in its discharge amount so as to change the speed ratio.

In the above-mentioned structure of the HMT according to the present invention, since a timing for altering the transmission mode during an operation for changing the speed ratio is a time when the rotational speed of the group of planetary gears which are freely rotated by rotation of the speed change output part during the first transmission mode substantially coincides with the rotational speed of the same during the second transmission mode, the vehicle is prevented from being suddenly varied in its traveling speed when the transmission mode is exchanged.

Furthermore, in the case where such a timing for altering the transmission mode is set, a first clutch is interposed on the first drive train, and a second clutch on the second drive train. The first transmission mode is established by disengaging the first clutch and engaging the second clutch, and the second transmission mode by engaging the first clutch and disengaging the second clutch. Since the transmission mode exchanging timing is set at the time when the rotational speed of the group of planetary gears in the first transmission mode coincides with that in the second transmission mode as mentioned above, the clutches are prevented from being stressed during their engaging. Consequently, the strength of the clutches can be reduced so as to reduce their manufacturing costs and minimize them.

In this structure of the HMT, the transmission mode change timing corresponds to a certain speed ratio in a range of speed ratio to be set for forward traveling is set. When the speed ratio set for forward traveling is less than the certain speed ratio or when any speed ratio in its whole range to be set for rearward traveling is set, the HMT is placed into the first transmission mode. When the speed ratio set for forward traveling is more than the certain speed ratio, the HMT is placed into the second transmission mode. Then, the HMT is controlled in the speed ratio. Consequently, if the vehicle placed in the first transmission mode travels forward at low speed or rearward, high torque fitting a work by the vehicle can be obtained. If the vehicle placed in the second transmission mode travels forward at middle or high speed, a speed ratio can be selected (a traveling speed is changed) under efficient transmission with reduced loss in correspondence to the normal traveling. Furthermore, since the whole speed range for rearward traveling is established according to the first transmission mode, the traveling direction of the vehicle in the second transmission mode is only forward, thereby requiring no reversing drive train to be interposed between the differential part and the speed change output part in the HMT.

Furthermore, in order to provide a transmission system further improved in its transmission efficiency for establishing high speed, a four drive train is provided for transmitting power from the speed change input part to the speed change output part through neither the HST nor the differential part. A third transmission mode for transmitting power from the speed change input part to the speed change output part through the fourth drive train while the first and second drive trains are isolated from transmission is provided to the HMT. If the vehicle is placed in the first or second transmission mode, the four drive train is isolated from transmission.

In this structure, in order to prevent sudden speed variance during the exchange of transmission mode between the third transmission mode and the second transmission mode, when the maximum speed ratio for high speed forward traveling is set, the rotational speed of the speed change output part during the second transmission mode substantially coincides with the rotational speed of the speed change output part during the third transmission mode, and the second transmission mode and the third transmission mode are exchanged with each other.

A third clutch is interposed on the fourth drive train in addition to the first and second clutches while the timing for exchanging the transmission mode between the second and third transmission modes. Consequently, the stress applied on the third clutch during its operation can be reduced so as to reduce its manufacturing cost and minimize it.

Incidentally, the HMT in the third transmission mode is short of resistance against load. Therefore, a means for detecting the rotational speed of the prime mover is provided. The HMT is placed into the third transmission mode only when the rotational speed of the prime mover detected at the period for exchange between the second and third transmission modes is in or adjacent to a range between its rotational speed corresponding to the maximum torque of the prime mover and its rotational speed corresponding to the maximum output of the prime mover.

For amendment of the transmission mode change timing, each of the clutches is electrically controlled. A lag for electric operation and a lag for mechanical operation are computed. Referring to the sum of both the lags as an amendment time, the transmission mode change timing is advanced at the amendment time so that just when the exchange of clutches is completed, a speed ratio fitting the transmission mode change timing is reached, thereby preventing sudden variance of speed during the exchange of clutches.

During an operation of changing the speed ratio, a speed ratio is momently detected. It is computed how much the detected speed ratio becomes when the amendment time computed as mentioned above has passed. When this computed speed ratio is decided to become the speed ratio corresponding to the transmission mode change timing, the transmission mode is exchanged at this time.

When a brake for braking the speed change output part is operated, all the clutches on the first and second drive trains (and the four drive train, if it is provided) are disengaged so as to prevent the driving force from being applied together with the braking force onto the speed change output part, thereby smoothing the braking and protecting the clutches and other parts.

When the speed change output part is released from the braking condition with the braking means, the ratio of discharge amount of the hydraulic pump to that of the hydraulic motor in the HST is regulated to make the actual speed ratio agree with the set speed ratio, and then, one of all the clutches is engaged so as to revive one of the first and second transmission modes (and the third transmission mode). Due to this order, the clutches and other parts can be protected during the release of brake, and the traveling speed can be revived smoothly.

For setting a speed ratio, a speed ratio setting means manipulated by an operator is provided. A position of the speed ratio setting means is detected and a target speed ratio is set in correspondence to the detected position. Both the hydraulic pump and the hydraulic motor in the HST are of a variable displacement type. The range for setting a speed ratio comprises a pump control zone for varying only discharge amount of the hydraulic pump and a motor control zone for varying only discharge amount of the hydraulic motor. The pump control zone and the motor control zone are continuous to each other. If the boundary speed ratio between the pump control zone and the pump control zone is between the target speed ratio and the actual speed ratio, both the hydraulic pump and the hydraulic motor are simultaneously regulated in their discharge amount so that the actual speed ratio quickly reaches the target speed ratio in correspondence to the large shift, or the large difference in speed ratio between actual and target, thereby establishing desirable acceleration or deceleration.

Also, in such a manner that the increase or decrease of speed is accelerated when the degree of shift is as large as over the different speed ratio setting ranges, if the boundary speed ratio between the target speed ratio and the actual speed ratio, and the speed ratio corresponding to the transmission mode change timing are between the pump control zone and the motor control zone, the speed ratio corresponding to the transmission mode change timing is set as a provisional target speed ratio, and then, the discharge amounts of both the hydraulic pump and the hydraulic motor are simultaneously varied. Due to this order of operation, the problem that the clutches are actuated during the simultaneous variance in discharge amounts of both the hydraulic pump and motor can be prevented, thereby making it possible to protect the clutches and the like and to prevent sudden variance of speed ratio.

Furthermore, when the speed ratio is varied across the speed ratio corresponding to the transmission mode change timing, the transmission mode is not altered unless the voltage from the means for detecting the position of the speed ratio setting means is varied really with manipulation of the speed ratio setting means by an operator. Thus, even if the actual speed ratio becomes different from the set speed ratio so as to enter one speed ratio setting range other than that to which the set speed range belongs, the transmission mode is not exchanged so as to prevent the problem that the transmission mode is automatically altered frequently, thereby protecting the clutches and the like and stabilizing the vehicle in travel.

Next, regarding a continuously variable transmission like an HMT, that is provided with an HST having an electrically controlled speed ratio regulating means for varying at least a movable swash plate of its hydraulic pump (and that of its hydraulic motor, if required,), the variance ratio of the target speed ratio to the shift degree of the speed ratio setting means is not constant but varied in correspondence to each speed ratio setting range. For example, the variance ratio is held down in a low speed range for work by the vehicle so that the traveling speed is delicately adjusted by slight shift, thereby enabling fine work. On the other hand, the variance ratio is increased in a high speed range for a normal travel of the vehicle so that the vehicle can be accelerated and decelerated fittingly to its normal travel only by slight shift.

Furthermore, the shift speed of the speed ratio setting means is computed. Then, an amendment value is computed from the shift speed and the present target speed ratio corresponding to the real position of the speed ratio setting means, and added to or subtracted from the present target speed ratio so as to serve as a provisional target speed ratio. Accordingly, for example, if the speed ratio setting means is shifted fast for acceleration, the provisional target speed ratio is set considerably higher than the present target speed ratio set by the speed ratio setting means so that the speed ratio is increased to this provisional target speed ratio, thereby further accelerating the increase of traveling speed. In brief, if the traveling speed is desired to increase or decrease quickly, the speed ratio setting means is shifted fast while the shift degree thereof is slight, thereby enabling desirable acceleration or deceleration.

Suppose that the speed ratio set by the speed ratio setting means is 0. If the actual speed ratio is in an extremely low speed range for forward travel or for rearward travel, the target speed ratio is amended so as to reverse the rotational direction of a motor shaft of the HST. Thus, while the vehicle stands still, the HST repeats oil discharge for the forward travel and for the rearward travel alternately. Even if the vehicle is brought into stationary while being oriented downwardly on a slope, oil is circulated in the direction for the rearward traveling in the HST, thereby preventing its output rotation directed for forward traveling. On the contrary, even if being oriented upwardly on the slope, the output rotation of the HST directed for rearward traveling is prevented by the oil circulation for the forward traveling in the HST. Whichever is the case, oil circulation directed to prevent the descend of the vehicle on the slope is intermittently established in the HST, thereby surely holding the vehicle in stationary. Such a neutral condition of the HST can be obtained by electrically controlling the oil discharge from the variable displacement hydraulic unit in the HST instead of a conventional neutral-returning means like a spring, thereby reducing the manufacturing cost of the HST.

In this case, at least one of the hydraulic pump and the hydraulic motor is of a variable displacement type that is volumetrically regulated by tilting its swash plate. The amendment value of the target speed ratio is the minimum variance of angle of the movable swash plate so as to extremely diminish the oil leak while the speed ratio is 0. Consequently, the vehicle is prevented from mincingly moving. Even while such amendment value is set, it is sufficiently effective for preventing reckless driving of the vehicle on a slope or the like so as to surely hold the vehicle in stationary.

Suppose a vehicle having the continuously variable transmission is provided with a prime mover rotation control device (a governor) which can be placed in a load control mode for controlling the rotational speed of a prime mover in correspondence to the magnitude of load applied on the prime mover. When the prime mover rotation control device placed in the load control mode changes the rotational speed of the prime mover in correspondence to load on the prime mover, the speed ratio is controlled by the continuously variable transmission so as to adjust the rotational speed of the speed change output part to a rotational speed fitting the set traveling speed so that the traveling speed can be maintained. Consequently, the vehicle can travel while at work at desirable constant speed and in the driving condition corresponding to load on the prime mover.

Furthermore, if this vehicle is provided with a PTO portion which is rotated by power of the prime mover at least in upstream from the speed change input part, and then the prime mover rotation control device is placed in the load control mode, the prime mover is not controlled in its rotation according to the selected load control mode unless power is transmitted to the PTO portion. Consequently, the load control mode, in which there are generated a variance of rotational speed of the PTO portion causing rough work and an uncomfortable difference of the rotational speed of the engine from that set by an accelerator, is limited.

Furthermore, the hydraulic motor in the HST is of a variable displacement type, as well as the hydraulic pump. If the actual speed ratio is different from the speed ratio set by the speed ratio setting means while the speed ratio setting means is out of operation for changing a speed ratio, first, the hydraulic pump is regulated in its discharge amount. Until the discharge amount of the hydraulic pump reaches its maximum, the hydraulic motor is not regulated in its discharge amount for making the actual speed ratio agree with the set speed ratio. Therefore, when the traveling speed is varied because of load on the engine or the like, the traveling speed can be held at the set speed because the speed ratio is controlled by the transmission without depending upon the engine control by the governor.

In association with steering, a steering operation means and a rotary means which is varied in its rotational speed in opposite directions correspondingly to the operational direction and degree of the steering operation means are provided. The rotation of the rotary means as well as the rotation of the speed change output part of the continuously variable transmission having an HST such as an HMT is transmitted to an axle differential device so as to differentially drive left and right drive wheels, thereby making the vehicle turn left or right. The speed ratio is decreased according to the increase of operational degree of the steering operation means. When the operational degree of the steering operation means becomes adjacent to the maximum, the rotation of the speed change output part stops. Consequently, by operating the steering operation means at a large degree, the vehicle can turn on a small circle and be gradually brought into spin-turn. Finally, when the steering operation degree reaches the maximum so as to stop the speed change output part, the vehicle can spin-turn on the minimum circle. Due to such a movement during steering, the vehicle can turn on a small butt. In other words, instead of the trouble to operate the speed ratio means for deceleration during the steering, only by extremely fully operating the steering operation means, the vehicle can be naturally decelerated and then spin-turn, thereby facilitating its operation for steering.

Furthermore, this control of speed ratio in correspondence to the operational degree of steering is not performed unless the traveling speed of the vehicle is less than a certain speed. Alternatively, it can be selected whether this control is performed or not. Therefore, the problem is prevented that the vehicle unexpectedly decelerates and spin-turns.

BRIEF DESCRIPTION OF THE DRAWINGS

FIG. 16 is a time chart of a speed ratio and controlled outputs of mode switching clutches 11 and 12 regarding the same amendment of the change period of transmission mode;

FIG. 21 is a flow chart of control for amending a speed ratio when the actual speed ratio becomes different from the set speed ratio because of variance of load or so on;

BEST MODE FOR CARRYING OUT THE INVENTION

Description will be given on a hydraulic and mechanical composite transmission (hereinafter referred to as an "HMT") 40 of the present invention in accordance with FIGS. 1–9.

HMT 40 is composed of an HST 21 and a mechanical speed change mechanism 30 having a differential part 7 as a planetary gear mechanism. In hereafter descriptions, as a usual formation, HST 21 and mechanical speed change mechanism 30 are arranged forward and backward respectively so as to define positions of respective parts. These positions may be changed according to circumstances. For example, the before-and-behind relationship between HST 21 and mechanical speed change mechanism 30 may be reversed.

Figure 1:
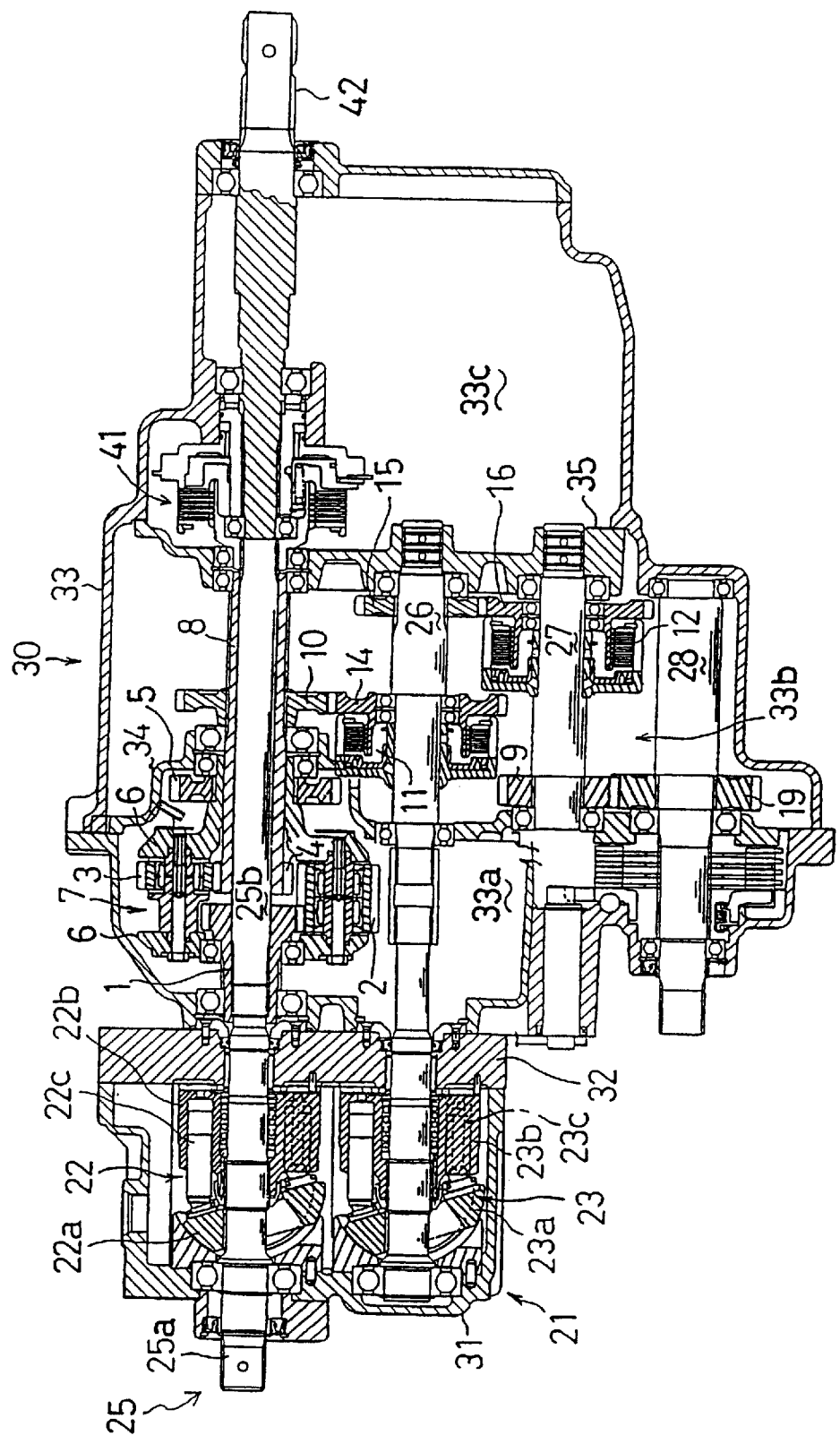
FIG. 1 is a development of an interior of an HMT 40 according to the present invention, as a cross sectional view along the lines 1—1 of FIG. 2.

As shown in FIG. 1, HST 21 comprises an HST housing 31 joined to a center section 32. In HST housing 31 are arranged in parallel a hydraulic pump 22 and a hydraulic motor 23, which are slidably rotatably attached to center section 32 so as to be fluidly connected with each other through a closed fluid circuit formed in center section 32. Center section 32 is fixed onto a front end of housing 33 for mechanical speed change mechanism 30.

As shown in FIG. 1 and others, an input shaft (a speed change input part) 25 is disposed substantially horizontally between HST 21 and mechanical speed change mechanism 30. Input shaft 25 may be made of a single shaft. However, in this embodiment, input shaft 25 consists of a front input shaft 25a and a rear input shaft 25b integrally joined coaxially with each other. Front shaft 25a penetrates HST housing 31 and center section 32. Rear shaft 25b is disposed in housing 33 so as to serve as a later-discussed first differential input part of differential part 7. Front shaft 25a serves as a later-discussed pump shaft of HST 21. A front end of front input shaft 25a projects forward from HST housing 31 toward a prime mover (in this embodiment, an engine) 24 so as to constitute an input part of HMT 40 (HST 21) receiving power of engine 24. A rear end of front input shaft 25a projects from center section 32 into housing 33 and is co-axially fixed to a front end of rear input shaft 25b with spline-fitting or the like. In housing 33, substantially vertical partition walls 34 and 35 are arranged before and behind.

Rear shaft 25b penetrates partition wall 34 and is journalled by partition wall 35 through a bearing.

HST 21 will be described. In HST housing 31 are structured an axial piston type hydraulic pump 22 using input shaft 25 (front input shaft 25a) as a pump shaft. In this regard, input shaft 25 penetrates a movable swash plate 22a. A cylinder block 22b is fittingly disposed around input shaft 25 so as not to be rotatable in relative to input shaft 25. A plurality of plungers 22c are slidably inserted into cylinder block 22b so that heads of plungers 22c abut against movable swash plate 22a. The slant angle of movable swash plate 22a is regulated so as to regulate the amount of hydraulic oil discharged from hydraulic pump 22. The hydraulic oil discharged from hydraulic pump 22 is sent to hydraulic motor 23 through an oil passage formed in center section 32.

Between the interiors of HST housing 31 and housing 33 is disposed an HST motor shaft 26 in parallel to input shaft 25. HST motor shaft 26 is journalled at its front and rear ends by HST housing 30 and partition wall 34 respectively through bearings. According to this embodiment, as shown in FIG. 1, HST motor shaft 26 is also constituted by coaxial two front and rear shafts fixedly joined with each other. Hereinafter, such integrally joined two coaxial front and rear shafts are referred to as HST motor shaft 26.

In HST housing 31 are structured an axial piston type hydraulic motor 23 centering around HST motor shaft 26. In this regard, HST motor shaft 26 penetrates a movable swash plate 23a. A cylinder block 23b is fittingly disposed around HST motor shaft 26 so as not to be rotatable in relative to HST motor shaft 26. A plurality of plungers 23c are slidably inserted into cylinder block 23b so that heads of plungers 23c abut against movable swash plate 23a. The slant angle of movable swash plate 23a is regulated so as to regulate the capacity of hydraulic pump 23, thereby regulating the rotational speed of hydraulic motor 23 in relative to the amount of oil discharged from hydraulic pump 22.

Figure 2:
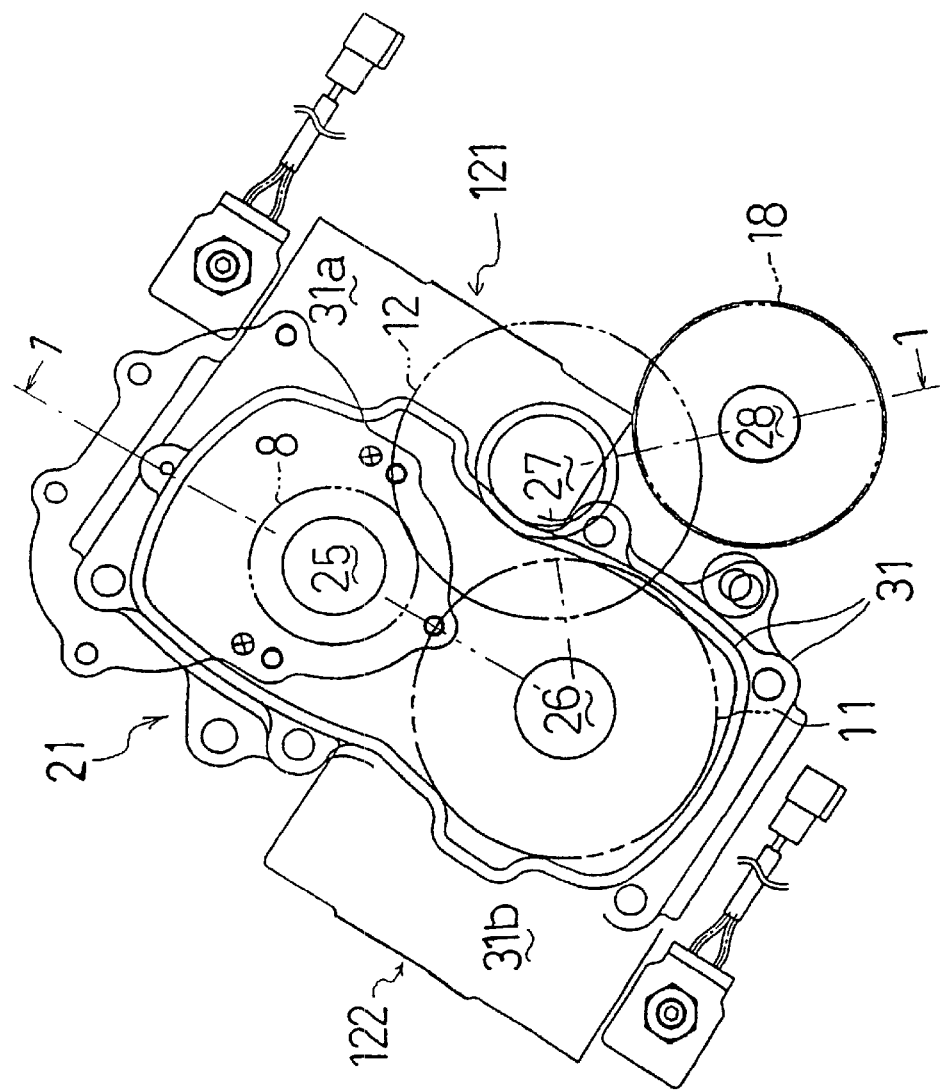
FIG. 2 is a front view of an HST 21 as a part of the same, including a schematic front view of arrangement of a group of HMT rotary shafts.
Figure 3:
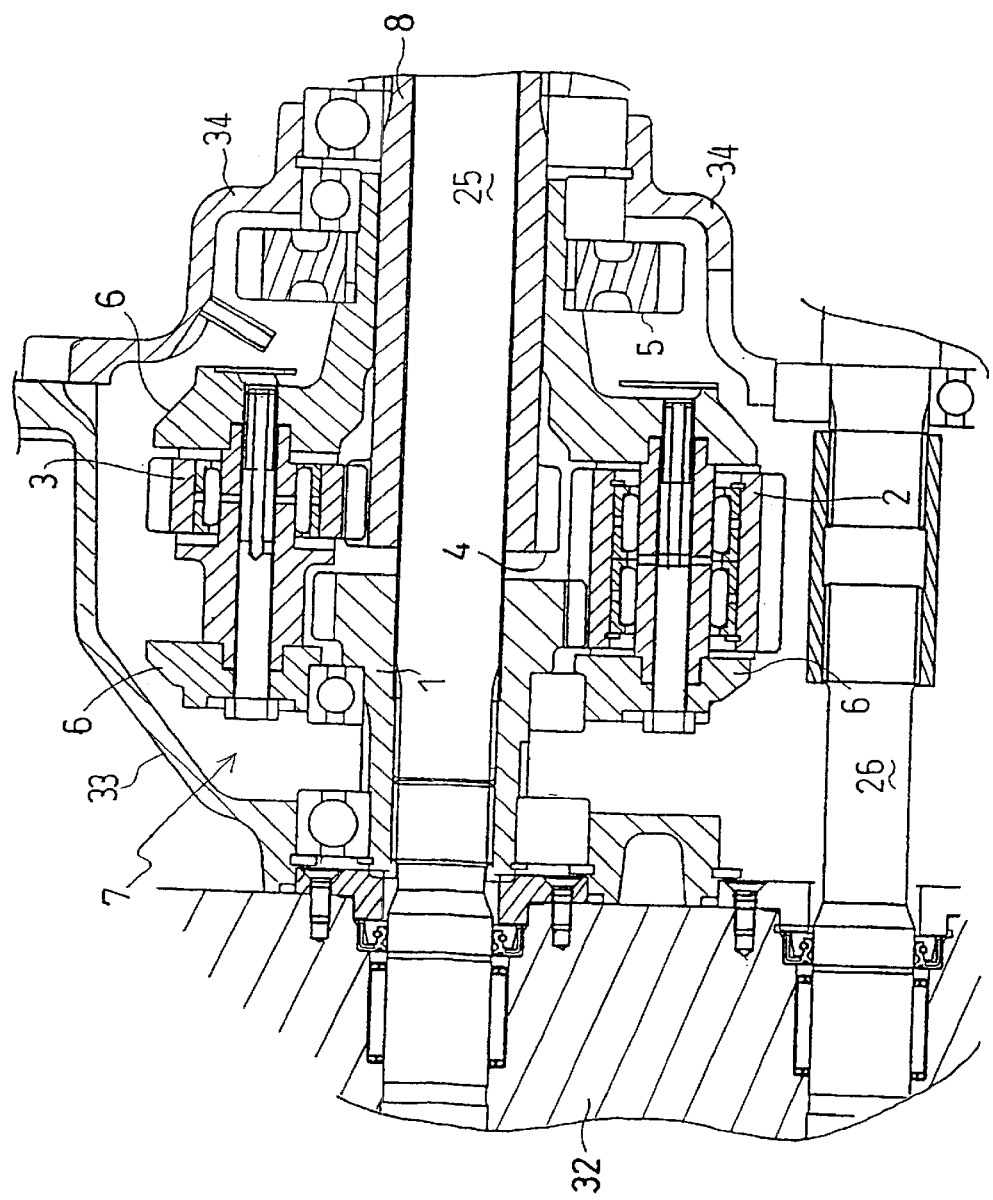
FIG. 3 is an enlarged fragmentary sectional side view of a differential part 7 in HMT 40.
Figure 4:
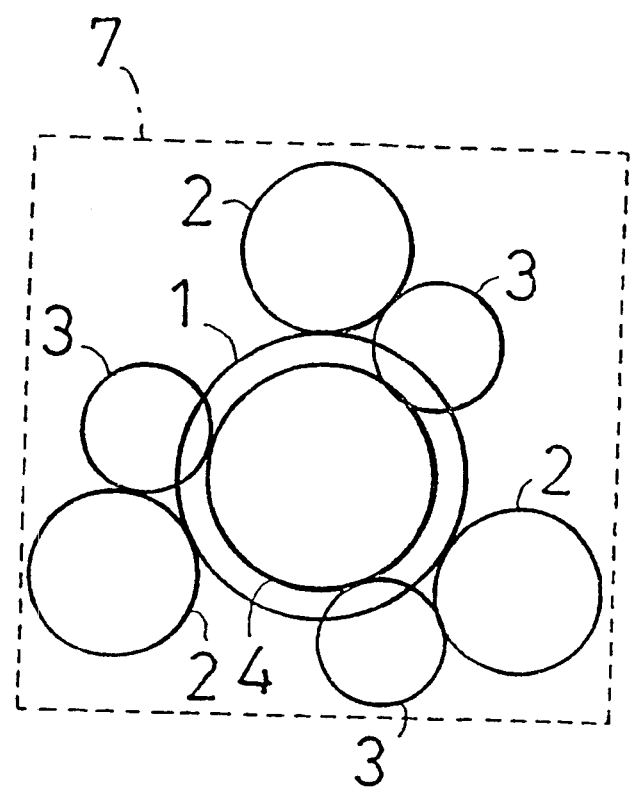
FIG. 4 is a schematic front view of a planetary gear mechanism of differential part 7.
Figure 5:
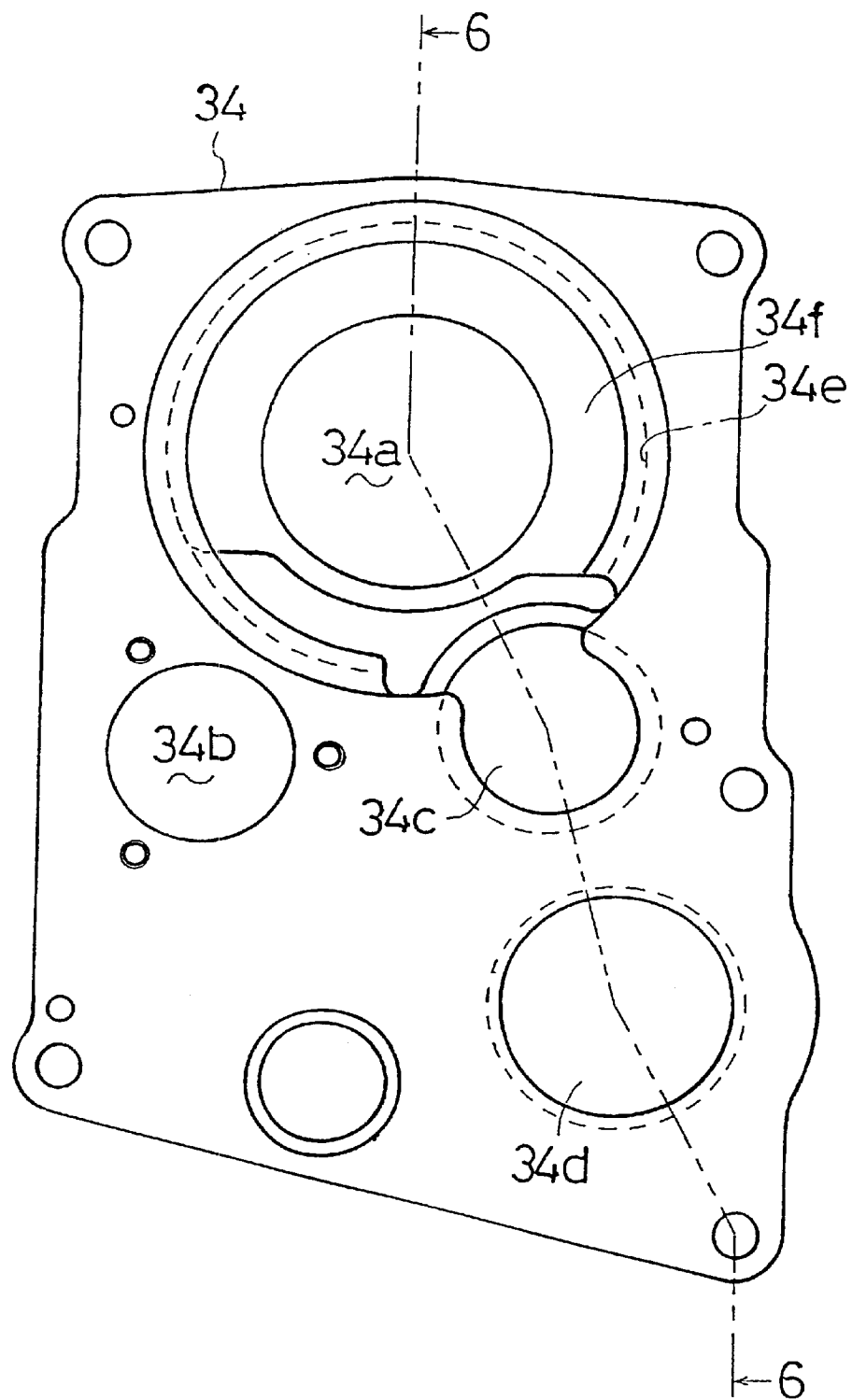
FIG. 5 is a front view of a partition wall 34.
Figure 9:
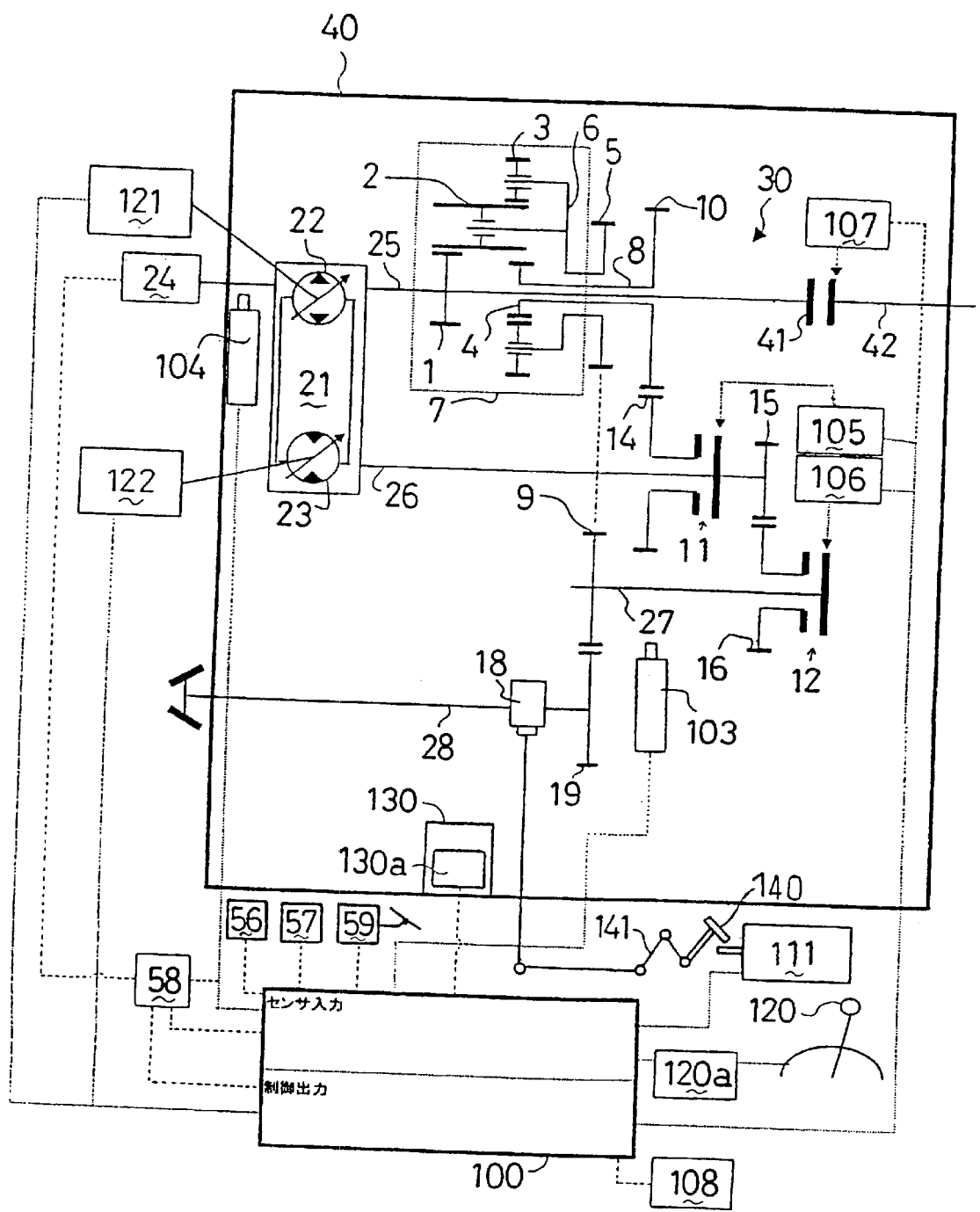
FIG. 9 is a diagram of HMT 40 and its electric control system.

As shown in FIGS. 2 and 9, a pump swash plate control device 121 and a motor swash plate control device 122, which are, for example, hydraulic servomechanisms, are provided as actuators for movable swash plate 22a of hydraulic pump 22 and movable swash plate 23a of hydraulic motor 23 respectively. Pump swash plate control device 121 and motor swash plate control device 122 are respectively incorporated in a pump control part 31a and a motor control part 31b of HST housing 31 as shown in FIG. 2. Control devices 121 and 122 are fittingly operated by a continuous shift of a speed ratio setting lever 120 serving as means for setting a speed ratio. They may be linked with lever 120 through a linkage. However, in this embodiment, as shown in FIG. 9, they are electrically controlled according to computation from the speed ratio set by a position sensor 120a of speed ratio setting lever 120 and from an actual speed ratio analyzed by an output side rotational speed detector 103 and an input side rotational speed detector 104.

Next, mechanical speed change mechanism 30 will be described. As shown in FIG. 1, partition walls 34 and 35 are disposed in housing 33 as mentioned above so as to divide the interior space of housing 33 into a first chamber 33a, a second chamber 33b and a third chamber 33c arranged in this order from front to rear. A first speed change output shaft 27 and a second speed change output shaft 28 are disposed substantially in parallel to input shaft 25 (rear input shaft 25b) and HST motor shaft 26 so as to constitute speed change output parts. Ends or intermediate portions of shafts 27 and 28 are journalled by any of partition walls 34 and 35 and housing 33 through bearings. When viewed in front (or rear), a positional relationship among rotary shafts 25, 26, 27 and 28 is such as shown in FIG. 2.

As shown in FIGS. 1 and 9, a PTO shaft 42 is rotatably supported in third chamber 33c and arranged coaxially to input shaft 25 so as to engage with and disengage from input shaft 25 through a hydraulic PTO clutch 41. PTO shaft 42 projects backward from the rear end of housing 33. Alternatively, an additional PTO shaft may be provided in parallel to shaft 42 and interlock with shaft 42 through multi-speed gears or the like in third chamber 33c so as to be able to establish multi-speeds.

As shown in FIG. 9, engagement and disengagement of PTO clutch 41 is controlled by an electromagnetic valve 107 whose output is controlled by controller 100. A PTO switch 57 is provided on a vehicle and electrically connected to controller 100. By switching on PTO switch 57, electromagnetic valve 107 is operated to engaging PTO clutch 41.

As shown in FIG. 1, second speed change output shaft 28 projects forward from housing 33. HMT 40 of this embodiment is applicable to a vehicle like a crawler tractor, a combine or other vehicles having crawlers, which is provided at the front portion thereof with drive axles. For transmitting power from second speed change output shaft 28 to a final driving mechanism like a transaxle apparatus (a differential gear unit interposed between the left and right drive axles) provided on a front portion of the vehicle, for example, a transmission shaft is interposed through universal joints. Additionally, sub multi-speed gears and so on may be interposed between second speed change output shaft 28 and this final driving mechanism.

If HMT 40 is used for a vehicle like a wheel tractor which is provided at its rear portion with drive axles, such a modification may be allowed that second speed change output shaft 28 is extended backward so as to interlock with a differential gear unit (a final driving mechanism) for the rear drive axles which may be disposed in third chamber 33c, for example. Also in this case, sub multi-speed gears may be interposed between second speed change output shaft 28 and the final driving mechanism.

In second chamber 33b, a gear 9 is fixed onto a portion of first speed change output shaft 27 close to the front end thereof. Gear 9 constantly engages with a gear 19 fixed on second speed change output shaft 28 so as to transmit the rotation of first speed change output shaft 27 to second speed change output shaft 28. The front end of second speed change output shaft 28 projects forward from housing 33, thereby, if the vehicle is a four-wheel vehicle, driving front wheels. In first chamber 33a, a brake package (in this embodiment, a multi-disc brake) 110 is arranged around second speed change output shaft 28. By pressing a brake pedal 140, brake package 110 is operated through a mechanical link 141 so as to brake second speed output shaft 28. Also, by pressing brake pedal 140, brake switch 111 is switched on and its switch-on signal is inputted into controller 100. When brake 110 is operated, both first and second speed change output shafts 27 and 28 are braked.

In second chamber 33b, a gear 16 is relatively rotatably disposed on a portion of first speed change output shaft 27 close to the rear end thereof. A wet multi-plate type hydraulic clutch 12 is interposed between first speed change output shaft 27 and gear 16. By engaging hydraulic clutch 12, gear 16 is integrally joined with first speed change output shaft 27. A gear 15 is fixed onto a portion of HST motor shaft 26 close to the rear end thereof so as to constantly engage with gear 16. Thus, the rotation of HST motor shaft 26 is transmitted to first speed change output shaft 27 through gears 15 and 16 and clutch 12.

Also, in second chamber 33b, a gear 14 is relatively rotatably provided on an intermediate portion of HST motor shaft 26. A wet multi-plate type hydraulic clutch 11 is interposed between HST motor shaft 26 and gear 14. By engaging hydraulic clutch 11, gear 14 is integrally joined with HST motor shaft 26. A gear 10 is fixed onto a transmission tube 8, which is relatively rotatably provided on input shaft 25 as discussed below, so as to constantly engage with gear 14 so that the rotation of HST motor shaft 26 is transmitted to transmission tube 8 through clutch 11 and gears 14 and 10.

As shown in FIG. 9, an electromagnetic valve 105 for switching clutch 11 and an electromagnetic valve 106 for switching clutch 12 are provided so that their outputs are controlled by controller (CPU) 100. According to this embodiment, valve 105 is switched off for disengaging clutch 11 and valve 106 is switched on for engaging clutch 12 so as to establish the HST mode. On the other hand, valve 105 is switched on for engaging clutch 11 and valve 106 is switched off for disengaging clutch 12 so as to establish the HMT mode.

In first chamber 33a, differential part 7 as a planetary gear mechanism is disposed around input shaft 25. Differential 7 will be described in accordance with FIGS. 1 and 3–9. A first sun gear 1 having outer peripheral teeth is fixed around input shaft 25 (rear input shaft 25b) so as to constitute a first differential input part. As mentioned above, transmission tube 8 is relatively rotatably provided around input shaft 25 (rear input shaft 25b) so as to interlock with HST motor shaft 26 through gears 14 and 10, thereby constituting a second differential input part. First sun gear 1 and transmission tube 8 are rotatably supported by housing 33 and partition wall 34 respectively through bearings. A transmission tube 8 is integrally formed on its front end with an outer peripherally toothed second sun gear 4. Carrier 6 is relatively rotatably provided around transmission tube 8 and journalled by partition wall 34 through a bearing. Carrier 6 is pivotally provided thereon with a first planet gear 2 engaging with first sun gear 1, and provided with a second planet gear 3 engaging with second sun gear 4. Accordingly, first and second planet gears 2 and 3 revolve around coaxial first and second sun gears 1 and 4 respectively.

When the rotational speed of first planet gear 2 following first sun gear 1 is different from that of second planet gear 3 following second sun gear 4, one of first and second planet gears 2 and 3 tends to relatively revolve around the other. However, the relative position between both gears 2 and 3 cannot be changed. In return, carrier 6 is actually rotated correspondingly to the relative revolution speed. Consequently, the greater difference of rotational speed there is between first and second sun gears 1 and 4, the faster carrier 6 rotates. If second sun gear 4 rotates oppositely to first sun gear 1 (in this embodiment, when HST motor shaft 26 is rotated for backward traveling), the difference is further increased so as to make carrier 6 rotate faster in comparison with the case where second sun gear 4 is rotated in the same rotational direction of first sun gear 1 (in this embodiment, when HST motor shaft 26 is rotated for forward traveling).

It is considered that second sun gear 4 is an inner peripherally toothed ring gear. However, such toothed second sun gear 4 is arranged so as to surround the outer revolution locus of second planet gear 3, thereby resulting in that differential part 7 is enlarged in the radial direction of input shaft 25. Thus, in this embodiment, second sun gear 4 is outer peripherally toothed and disposed coaxially with first sun gear 1 so as to minimize differential part 7 in its radial direction.

First sun gear 1 is attempted to receive the rotational force of an HST pump shaft so as to constitute the first differential input part. In this embodiment, first sun gear 1 is directly fixed onto rear input shaft 25b coaxially and integrally connected to front input shaft 25a serving as the pump shaft of HST 21. Hence, in comparison with the case where first sun gear 1 receives power from the pump shaft through a gear train, the power transmission efficiency therebetween is improved. Also, differential part 7 becomes coaxial with hydraulic pump 22 of HST 21, thereby enabling HMT 40 to be further minimized so as to be advantageously applicable to vehicles, industrial machineries such as agricultural machineries or construction machineries, and so on.

Now, description will be given on partition wall 34 and each of the rotary shafts journalled by partition wall 34 in accordance with FIGS. 1 and 5–8. Partition wall 34 is longitudinally bored therethrough with bearing holes 34a, 34b, 34c, 34d and so on. Bearings are fitted into the respective bearing holes, and the rotary shafts penetrate the respective bearings. In this regard, bearings are fitted into bearing holes 34b, 34c and 34d for rotatably supporting HST motor shaft 26, first speed change output shaft 27 and second speed change output shaft 28 respectively. The inner peripheral surface of bearing hole 34a is longitudinally sectioned into front and rear parts. Bearings for carrier 6 and transmission tube 8 are fitted into the front and rear parts of bearing hole 34a respectively. Furthermore, partition wall 34 is stepped in front of bearing hole 34a with first recess 34e and second recess 34f. First recess 34e accommodates the diametrically largest rear end portion of carrier 6. Second recess 34f behind first recess 34e accommodates a gear 5 fixed around the diametrically smallest portion of carrier 6.

A lower portion of second recess 34f is partly notched toward a space just behind bearing hole 34c. A gear 9 is arranged just behind bearing hole 34c so as to engage with gear 5 in second recess 34f.

Consequently, first and second chambers 33a and 33b communicate with each other through the engaging portion between gears 5 and 9. However, partition wall 34 generally separates first chamber 33a accommodating differential part 7 from second chamber 33b accommodating hydraulic clutches 11 and 12 so as to prevent sludge generated from hydraulic clutches 11 and 12 from influencing differential part 7, thereby securing the endurance of differential part 7.

By switching on and off hydraulic clutches 11 and 12, the transmission mode of HMT 40 constructed as the above is changed between a first transmission mode (hereinafter referred to as an "HST mode") and a second transmission mode (hereinafter referred to as an "HMT mode"). In the HST mode, only the driving effort of hydraulic motor 23 of HST 21 (the rotational effort of HST motor shaft 26) is transmitted to first speed change output shaft 27. In the HMT mode, the rotational effort of carrier 6 of differential part 7 differentially connecting input shaft 25 as the input shaft of HST 21 with HST motor shaft 26 is transmitted to first speed change output shaft 27.

In this regard, when hydraulic clutch 11 is disengaged and hydraulic clutch 12 is engaged, the rotation of HST motor shaft 26 is transmitted through gears 15 and 16 without differential part 7 to first speed change output shaft 27, and then transmitted to the front and rear drive wheels of the vehicle. Incidentally, since gear 9 fixed on first speed change output shaft 27 constantly engages with gear 5 of differential part 7, carrier 6 runs idle around transmission tube 8, and planet gears 2 and 3 freely rotate between carrier 6 and first sun gear 1. Such a state where only the rotational force of hydraulic motor 23 of HST 21 is used for driving the vehicle is referred to as the HST mode.

On the other hand, when hydraulic clutch 11 is engaged and hydraulic clutch 12 is disengaged, the rotation of HST motor shaft 26 is not directly transmitted through gears 15 and 16 to first speed change output shaft 27, but transmitted through clutch 11 and gears 14 and 10 to second sun gear 4. Then, the rotation of carrier 6 as the planetary gear mechanism, which rotates while being differentially connecting second sun gear 4 to first sun gear 1 rotating integrally with input shaft 25, is transmitted through gears 5 and 9 to first speed change output shaft 27. This state is referred to as the HMT mode.

Description will be given on control of electromagnetic valves 105 and 106 for switching respective hydraulic clutches 11 and 12 concerning selection of these transmission modes, and on an electric control system and a control method for pump swash plate control device 121 and motor swash plate control device 122 concerning the above-mentioned determination of discharge amount of the hydraulic pump and motor, in accordance with FIGS. 9–11.

The setting of a speed ratio depends upon the detection of voltage of position sensor 120a varied by shifting speed ratio setting lever 120. In order to analyze an actual speed ratio, as shown in FIG. 9, the rotational speed of input shaft 25 (hereinafter, referred to as "input rotational speed" of HMT 40) is detected by an input side rotational speed detector 104 arranged adjacent to input shaft 25, and the rotational direction and speed of first speed change output shaft 27 (hereinafter, this rotational speed is referred to as "output rotational speed" of HMT 40) is detected by an output side rotational speed detector 103 arranged adjacent to first speed change output shaft 27 (gear 9 thereon). The detection signals of both detectors 103 and 104 is input into controller 100 so as to calculate a ratio of the detection value of output side rotational speed detector 103 to that of input side rotational speed detector 104, i.e., a ratio of the output rotational speed to the input rotational speed, referred to as the speed ratio.

Thus, the detection signal of position sensor 120a as a target speed ratio is input into controller 100. Controller 100 computes an actual speed ratio from the detection of both rotational speed detectors 103 and 104. Then, at least one of pump swash plate control device 121 and motor swash plate control device 122 serving as output means is operated so as to make the actual speed ratio agree with the target speed ratio. Additionally, electromagnetic valves 105 and 106 are exchanged with each other in their opening and closing at the period for changing the transmission mode.

Incidentally, for serving as one of output means of controller 100, a speed ratio indicator 108 is electrically connected to controller 100 in addition to as above-mentioned electromagnetic valves 105, 106 and 107. Speed ratio indicator 108 may indicate the target speed ratio on the basis of the detection signal of position sensor 102a. Alternatively, it may indicate the actual speed ratio on the basis of the computation of speed ratio by using both rotational speed detectors 103 and 104.

Furthermore, for serving as one of input means of controller 100, an oil temperature sensor 131 for detecting the temperature of hydraulic oil is provided on a hydraulic oil tank 130. The temperature detected by temperature sensor 131 is used for amending the period for changing the transmission mode as discussed below referring to FIG. 15.

Furthermore, for serving as means for controlling the engine rotational speed, an engine rotation controller 58 as an electric governor is electrically connected to controller 100. A vehicle is provided thereon with an accelerator like a lever or a pedal serving as a rotational speed setting means, a position (an angle) of which is detected by an accelerator sensor 59 electrically connected to controller 100. On the basis of the detection value of accelerator sensor 59, engine rotation controller 58 adjusts an actual engine rotational speed so as to make it agree with the rotational speed set by the accelerator. Also, this engine rotation controller 58 can be set into a load control mode, wherein the engine rotational speed set by the accelerator can be amended on the basis of detection of load on an engine in correspondence to excessive load or light load. The speed ratio control corresponding to the variance of engine rotational speed in the load control mode will be discussed later in accordance with FIGS. 24 and 25.

Figures 10, 11:
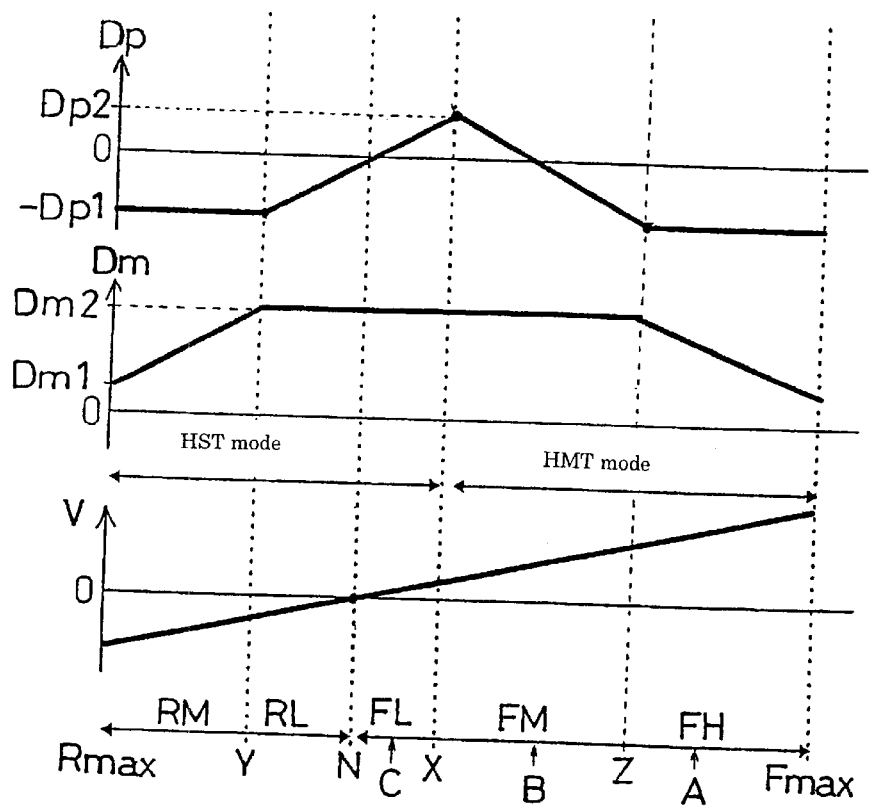
FIG. 10 is a graphical representation of hydraulic control of the HST in the whole range of speed ratio to be set of HMT 40, including a pump discharge graph, a motor discharge graph and a speed ratio graph.
FIG. 11 is a table regarding control of HMT 40, describing a relation of the speed ratio setting point to each transmission mode, and a condition of actuation of a clutch in each transmission mode.

As shown in FIG. 10, speed ratio V is optionally and continuously set by speed ratio setting lever 120 from a rearward traveling middle speed range RM to a forward traveling high speed range FH through a rearward traveling low speed range RL, a stationary (neutral) position N, a forward traveling low speed range FL and a forward traveling middle speed range FM. On the assumption that the engine rotational speed is constant in the whole speed ratio range to be set, this graph of speed ratio V can be replaced with the output rotational speed (the rotational speed of first speed change output shaft 27). In this graph of speed ratio V, the values during rotation for forward traveling are positive, and those during rotation for rearward traveling are negative.

As shown in FIGS. 10 and 11, when speed ratio V is set between rearward traveling middle speed range RM and forward traveling low speed range FL, the HST mode is selected so that the vehicle drives only with the rotational force of hydraulic motor 23 of HST 21. When speed ratio V is set between forward traveling middle speed range FM and forward traveling high speed range FH, the HMT mode is selected so that first speed change output shaft 27 is accelerated by the rotation of carrier 6. In other words, when speed ratio setting lever 120 is located at a speed ratio setting position for change of the transmission mode (hereinafter, such a position is referred to as a "mode change position") X serving as a boundary between forward traveling low speed range FL and forward traveling middle speed range FM or its vicinity, and then, the computed actual speed ratio reaches a speed ratio corresponding to the change of transmission mode (hereinafter, such a speed ratio is referred to as a "mode change speed ratio") Vx, electromagnetic valves 105 and 106 are exchanged with each other in their opening and closing so as to change the transmission mode.

This change period of transmission mode, i.e., mode change position X defining the boundary between forward traveling low speed range FL and forward traveling middle speed range FM must be set so that the rotational speed of first speed change output shaft 27 is not suddenly varied by change of transmission mode. As mentioned above, during the HST mode, carrier 6 runs idle following the rotation of first speed change output shaft 27. Thus, mode change position X is preferably set at the speed ratio setting position which agrees with the driving speed of carrier 6 caused by the difference of rotational speed between first sun gear 1 rotating integrally with input shaft 25 (i.e., the pump shaft of hydraulic pump 22) and second sun gear 4 following HST motor shaft 26 (i.e., the motor shaft of hydraulic motor 23) during the HMT mode.

While speed ratio setting lever 120 is shifted from a maximum backward traveling speed ratio setting position Rmax to a maximum forward traveling speed ratio setting position Fmax through neutral position N, either pump swash plate control device 121 or motor swash plate control device 122 is operated on the basis of detection by position sensor 120a so as to optionally change the position of either movable swash plate 22a of hydraulic pump 22 or movable swash plate 23a of hydraulic motor 23. Referring to FIG. 10, a pump discharge amount Dp as an amount of oil discharged from hydraulic pump 22 during the forward traveling is a positive value varying in proportion to a slant angle of movable swash plate 22a from the neutral position (hereinafter, simply named as a "slant angle") in its forward traveling rotation range, and pump discharge amount Dp during the rearward traveling is a negative value in proportion to the slant angle in the rearward traveling rotation range of swash plate 22a. By rotating movable swash plate 23a from its minimum slant angle to its maximum slant angle, a motor discharge amount Dm can be regulated to an amount from its minimum amount Dm1 to its maximum amount Dm2. As motor discharge amount Dm is increased, the relative discharge amount of hydraulic pump 22 to hydraulic motor 23 is decreased so as to reduce the rotational speed of HST motor shaft 26.

Therefore, at first, when speed ratio setting lever 120 being at maximum rearward traveling speed position Rmax, movable swash plate 22a of hydraulic pump 22 is slantingly rotated to the maximum angle in its rearward traveling rotation range so as to make pump discharge amount Dp for backward traveling the maximum, and movable movable swash plate 23a of hydraulic motor 23 is slantingly rotated to the minimum angle so as to set motor discharge amount Dm to minimum amount Dm1. Consequently, a relative discharge amount of hydraulic pump 22 to hydraulic motor 23 (hereinafter, simply named as a "relative discharge amount") becomes the maximum which is the maximum of pump discharge amount Dp from which minimum motor discharge amount Dm1 (Dm1>0) is subtracted, thereby rotating HST motor shaft 26 at the maximum speed in the reverse direction (for the rearward traveling of the vehicle).

As speed ratio setting lever 120 is shifted from maximum rearward traveling speed ratio position Rmax so as to reduce the backward traveling speed, the slant angle of movable swash plate 23a is increased, i.e., motor discharge amount Dm is increased while movable swash plate 22a is kept slant at the maximum angle for rearward traveling, thereby reducing the relative discharge amount. The shift point where slantingly rotated swash plate 23a reaches its maximum slant angle so as to set motor discharge amount Dm to maximum amount Dm2 is defined as a boundary point Y between rearward traveling middle speed range RM and rearward traveling low speed range RL. During the deceleration process by shifting speed reduction setting lever 120 within rearward traveling low speed range RL from boundary position Y to stationary position N, movable swash plate 22a is slantingly rotated from the maximum slant angle for rearward traveling to its neutral position so as to reduce its slant angle while movable swash plate 23a is held so that motor discharge amount Dm is kept maximum amount Dm2. In brief, pump discharge amount Dp in the backward traveling is reduced so as to decelerate the reverse rotation of HST motor shaft 26.

After speed ratio setting lever 120 is shifted through stationary position N into forward traveling low speed range FL, maximum motor discharge amount Dm2 is kept, and movable swash plate 22a is slantingly rotated in its forward traveling rotation range from its neutral position so as to rotate HST motor shaft 26 in the normal direction (for the forward traveling of the vehicle). Then, pump discharge amount Dp is increased so as to accelerate HST motor shaft 26 in the normal direction.

As mentioned above, until speed ratio setting lever 120 is shifted from maximum backward traveling speed ratio position Rmax to mode change position X between forward traveling low speed range FL and forward traveling middle speed range FM, the transmission mode is the HST mode so that the rotation of HST motor shaft 26 is transmitted to first speed change output shaft 27 (and second speed change output shaft 28) without passing differential part 7. The rotational speed of first speed change output shaft 27 is proportional to that of HST motor shaft 26. The rotational direction of first speed change output shaft 27 is changed by changing the rotational direction of HST motor shaft 26.

When arising pump discharge amount Dp, while motor discharge amount Dm is kept to be maximum amount Dm2, reaches Dp2, the rotational speed of first speed change output shaft 27 rotated according to the HST mode agrees with that according to the HMT mode. Then, at this timing, discharged hydraulic clutch 11 is engaged and engaged hydraulic clutch 12 is discharged, thereby establishing the HMT mode. At this time, movable swash plate 22a may not be slanted to the maximum slant angle, i.e., pump discharge amount Dp2 may not be the maximum capable amount. All to be required is that pump discharge amount Dp2 is set so as to enable the change period from the HST mode to the HMT mode to be obtained. This position of speed ratio setting lever 120 where pump discharge amount Dp2 is established may be referred to as mode change position X so that when shifted speed ratio setting lever 120 reaches mode change position X, the transmission mode is changed.

After the transmission mode is switched to be the HMT mode, the rotation of carrier 6 of differential part 7 is transmitted to first speed change output shaft 27. During the shift of speed ratio setting lever 120 for acceleration within forward traveling middle speed range FM, pump discharge amount Dp is decreased so as to decelerate the rotation of HST motor shaft 26 in the normal direction while motor discharge amount Dm is kept to be maximum amount Dm1. At last, HST motor shaft 26 becomes stationary, and then, rotates its reverse direction so as to increase the rotational speed. Thus, the difference of rotational speed between first sun gear 1 and second sun gear 4 is increased so as to accelerate the rotation of carrier 6.

The shift position where pump discharge amount Dp reaches a maximum amount $-Dp1$ for rearward traveling (i.e., movable swash plate 22a is slantingly rotated to the maximum slant angle in its rearward traveling rotation range) is set as a boundary position Z between forward traveling middle speed range FM and forward traveling high speed range FH. Afterward, during the further shift of speed ratio setting lever 120 to maximum forward traveling speed ratio position Fmax in forward traveling high speed range FH, pump discharge amount $-Dp1$ is kept and movable swash plate 23a is slantingly rotated so as to reduce its slant angle, whereby motor discharge amount Dm is increased. Consequently, the above-mentioned relation speed is increased so as to increase the reverse rotational speed of HST motor shaft 26. Thus, the difference of rotational speed between first sun gear 1 and second sun gear 4 is increased so as to accelerate the rotation of carrier 6, thereby establishing high speed output rotation for forward traveling (of first and second speed change output shafts 27 and 28).

As mentioned above, by adjusting the slant angles of movable swash plate 22a and 23a according to the shift of speed ratio setting lever 120 and by switching the transmission mode between the HST mode and the HMT mode, smoothly continuous variance of the output rotation (of first and second speed change output shafts 27 and 28) can be obtained in the whole range to be set by speed ratio setting lever 120, thereby contributing for produce of a vehicle which is comfortable in speed change.

Now, such a case is assumed that HMT 40 controlled in this manner is provided on a working vehicle such as an agricultural tractor, which is usually intended to travel at work between its rearward traveling range and forward traveling low speed range. During the working travel, the vehicle is driven in the HST mode wherein the rotation of HST motor shaft 26 with high torque is substantially directly transmitted to first speed change output shaft 27 through gears 15 and 16 and hydraulic clutch 12. Thus, the vehicle is sufficiently endurable against large working load so as to travel without an engine failure. Furthermore, the traveling speed of the vehicle can be minutely continuously changed so as to secure a work of high quality.

The vehicle is driven in the HMT mode when its traveling speed is set between a forward traveling middle speed range and a forward traveling high speed range. At this time, of course, the traveling speed can be continuously changed. Furthermore, the loss of engine output can be restricted so as to reduce fuel expenses. This is greatly advantageous in a case where a small size vehicle having a low-torque engine is attempted to travel at high speed.

If the HMT is replaced with a mechanical multi-speed change device to which power from the motor shaft of the HST is transmitted in tandem, the mechanical speed change device must be provided with many drive trains like gears for establishing sufficiently many speed stages in wide from low to high so that the mechanism thereof is complicated and entirely enlarged. Also, while the HST is provided, the traveling speed must be changed step by step. However, the HMT according to the present invention can continuously change its output speed in the whole traveling speed range to be set. Besides, differential part 7 is structured as one unit so as to simplify and minimize the entire structure of the HMT, thereby easing its assembly and reducing the manufacturing costs. Incidentally, as mentioned above, multi-speed change mechanism such as a gear type may be disposed at the transmission downstream of first speed change output shaft 27, when required.

Figure 12:
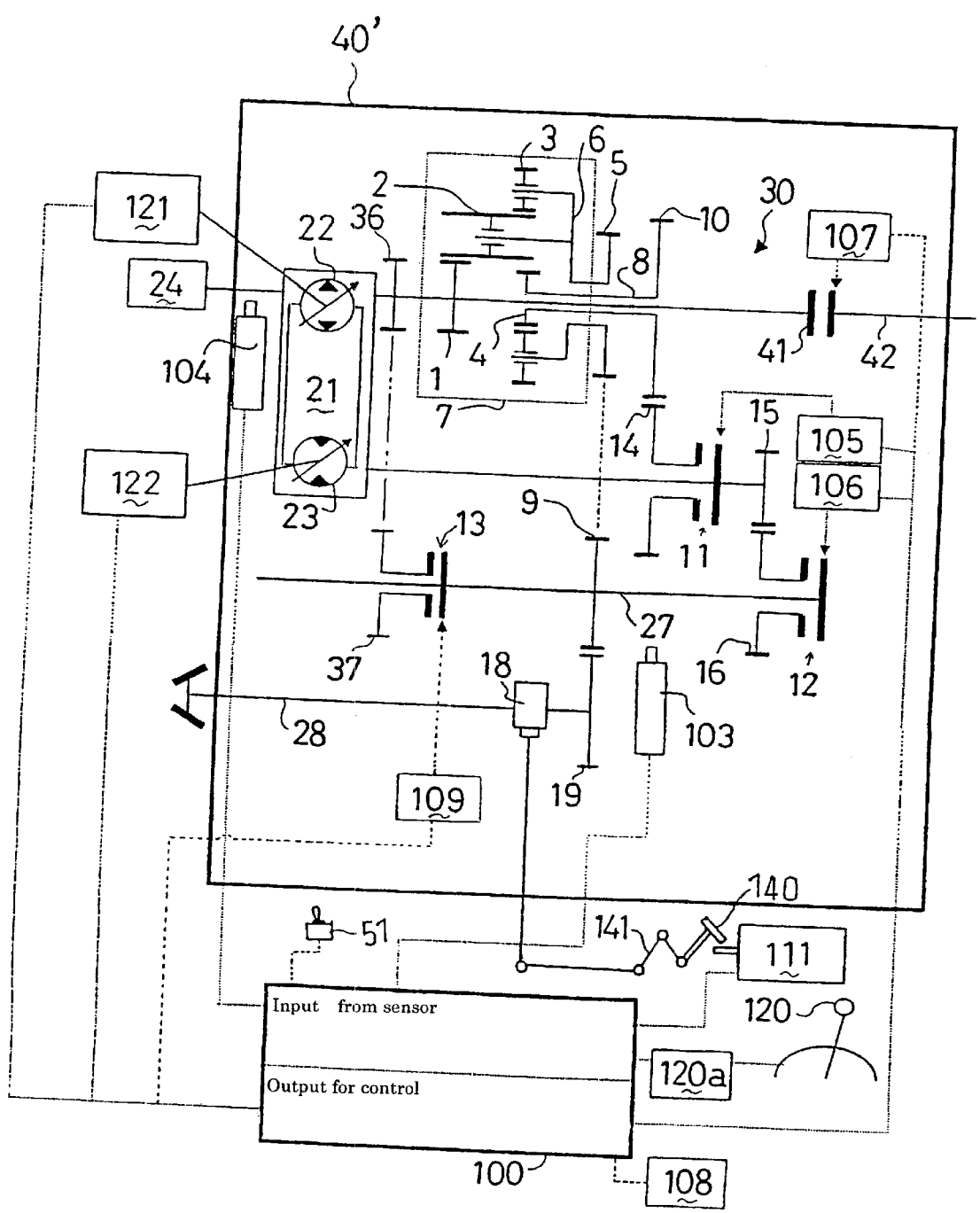
FIG. 12 is a diagram of an HMT 40' as a modification of HMT 40 and its electric control system, wherein a gear train is additionally interposed between an input shaft 25 and a first speed change output shaft 27.

An HMT 40' shown in FIG. 12 is a modification of HMT 40. In HMT 40', a drive train from input shaft 25 to first speed change output shaft 27 without either passing HST 21 or differential part 7 is additionally provided. In this regard, a gear 36 is fixed onto input shaft 25. A gear 37 is relatively rotatably provided around first speed change output shaft 27 so as to constantly engage with gear 36. A hydraulic clutch 13 is provided around first speed change output shaft 27 so as to be interposed between gear 37 and first speed change output shaft 27.

Hydraulic clutch 13 is engaged and disengaged by an electromagnetic valve 109 controlled by controller 100.

In this structure, when both hydraulic clutches 11 and 12 are disengaged and hydraulic clutch 13 is engaged, engine power is transmitted from input shaft 25 to first speed change output shaft 27 through gears 36 and 37 and hydraulic clutch 13 without passing HST 21 or differential part 7. Accordingly, first speed change output shaft 27 can be rotated fast without loss of power in transmission. Such a transmission mode is referred to as a mechanical drive mode.

Figures 13, 14:
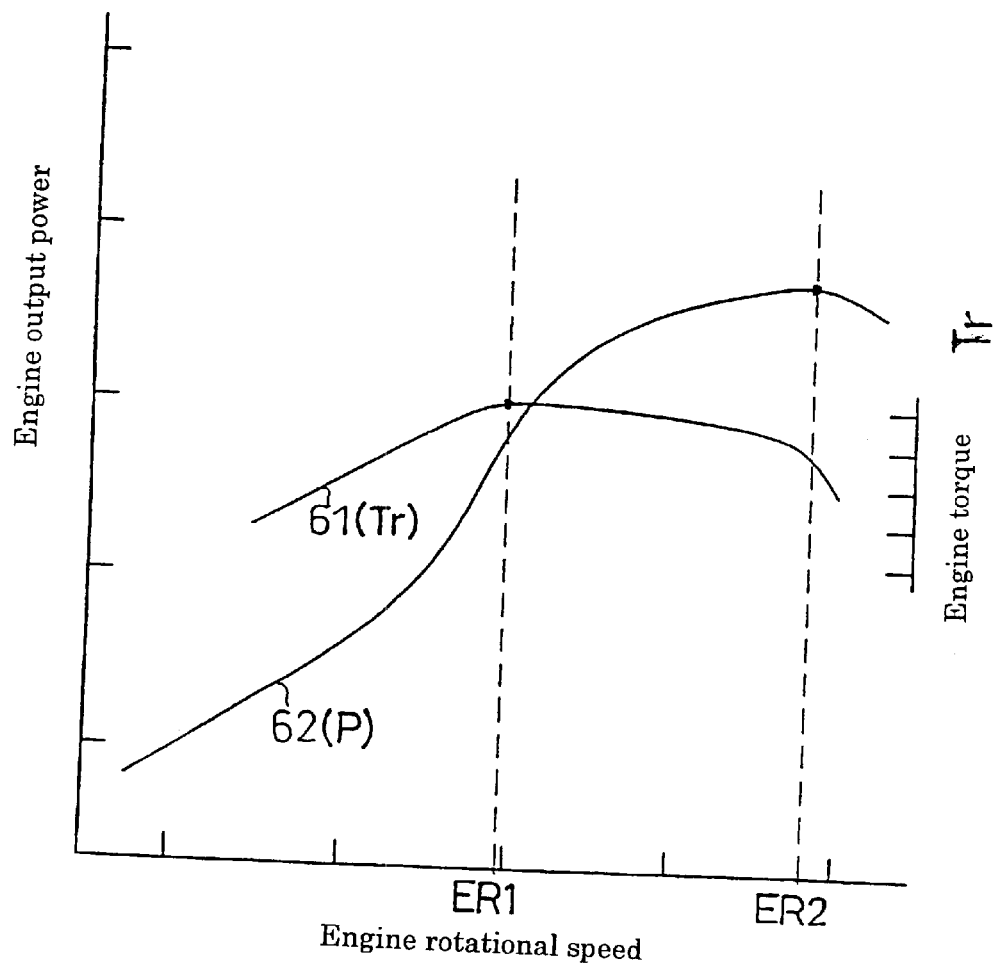
FIG. 13 is a table regarding control of HMT 40', describing a relation of the speed ratio setting point to each transmission mode, and a condition of actuation of a clutch in each transmission mode.
FIG. 14 is a graph of an engine characteristic regarding restriction of a mechanical drive mode in HMT 40'.

FIG. 13 is a table describing clutches 11, 12 and 13 in respective transmission modes of HMT 40'. The transmission mode is switched into the mechanical drive mode when the maximum speed ratio is set in forward traveling high speed range FH. In detail, during the switching from the HMT mode to the mechanical drive mode, engaged clutch 11 is disengaged, clutch 12 is kept to be disengaged, and disengaged clutch 13 is engaged.

The mode change period from the HMT mode to the mechanical drive mode is attempted to be a time when the output rotational speed (of first speed change output shaft 27) established by the rotation of carrier 6 of differential part 7 through gears 5 and 9 substantially coincides with that established by the transmission from input shaft 25 through gears 36 and 37. Therefore, when the transmission mode is changed from the HMT mode to the mechanical drive mode, sudden speed difference is not generated so as to secure a smooth speed change. In other words, speed ratio V that can prevent the difference of speed during the mode change between the HMT mode and the mechanical drive mode is provided as this speed ratio corresponding to the transmission mode change. After the transmission mode is changed into the mechanical drive mode, the speed change can be performed only by variance of engine rotational speed, i.e., setting of the accelerator. Therefore, it is appropriate that the speed ratio setting position corresponding to the mode change from the HMT mode to the mechanical drive mode agrees with maximum forward traveling speed ratio position Fmax of speed ratio setting lever 120.

However, the above discussion disregards characteristics of an engine. FIG. 14 shows a torque plot 61 and an output power plot 62 in relation to a rotational speed ER of an engine 24 of a certain type. This engine is lacking in both torque and output power until its rotational speed ER reaches a certain rotational speed ER1. When engine rotational speed ER is equal to or exceeds rotational speed ER1, a torque Tr becomes stable, and output power P is increased according to the increase of engine rotational speed ER. However, if engine rotational speed ER exceeds a certain rotational speed ER2, output power P is reduced, and torque Tr suddenly falls down.

In the mechanical drive mode, the engine is likely to be stressed by load because power from input shaft 25 is transmitted to first speed change output shaft 27 in a direct way through gears 36 and 37. When engine rotational speed ER falls short of rotational speed ER1 or exceeds rotational speed ER2 in the mechanical drive mode, even if speed ratio setting lever 120 is located at maximum speed ratio position Fmax, the torque and output power is insufficient to endure the load so that the engine may be stalled at worst.

Therefore, when the time comes to the mode change period from the HMT mode to the mechanical drive mode, engine rotational speed ER is detected by rotational speed detector 103 and the like. If engine rotational speed ER is off the range between rotational speeds ER1 and ER2 and its vicinity, the transmission mode is not changed into the mechanical drive mode.

Various embodiments regarding control of above-mentioned HMT 40 will be described in accordance with FIGS. 15–18. Incidentally, these embodiments is applicable to HMT 40' and embodiments regarding control of HMT 40' as shown in FIGS. 12–14.

As mentioned above, basically, speed ratio setting lever 120 is shifted so as to change the position of movable swash plate 22a or 23a and the transmission mode is changed between the HST mode and the HMT mode so that the output speed of HMT 40 is sequentially changed in the whole speed ratio range set by speed ratio setting lever 120. Furthermore, it will be attempted that the change period of transmission mode is amended, the ratios of acceleration and deceleration are amended, and so on, thereby improving HMT 40 in its speed change feeling.

At first, description will be given on an amendment of the change period of transmission mode in accordance with FIGS. 15 and 16. Incidentally, this embodiment employs the structure that the change of transmission mode depends upon computation of speed ratio V on the basis of detection by input side rotational speed detector 104 and output side rotational speed detector 103.

Figure 6:
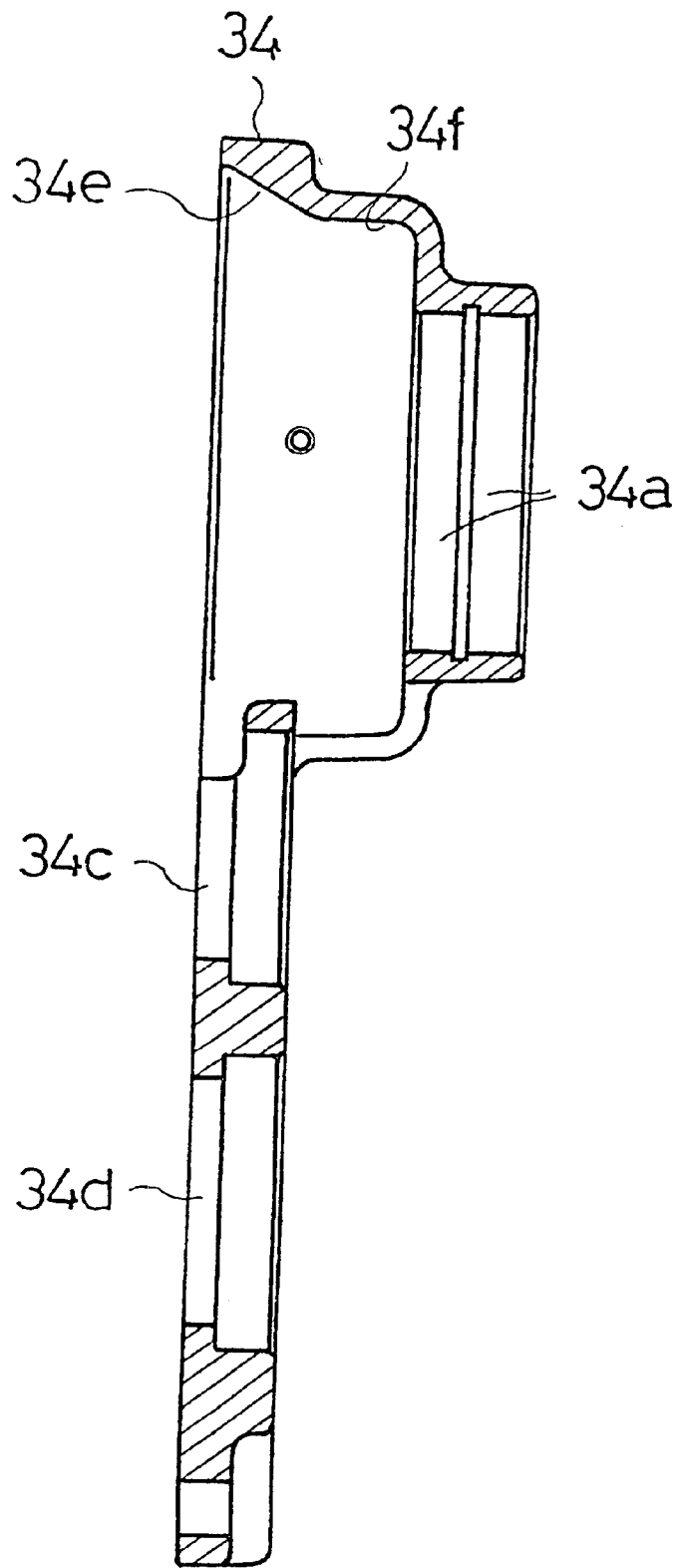
FIG. 6 is a cross sectional view taken along the lines 6—6 of FIG. 5.
Figure 7:
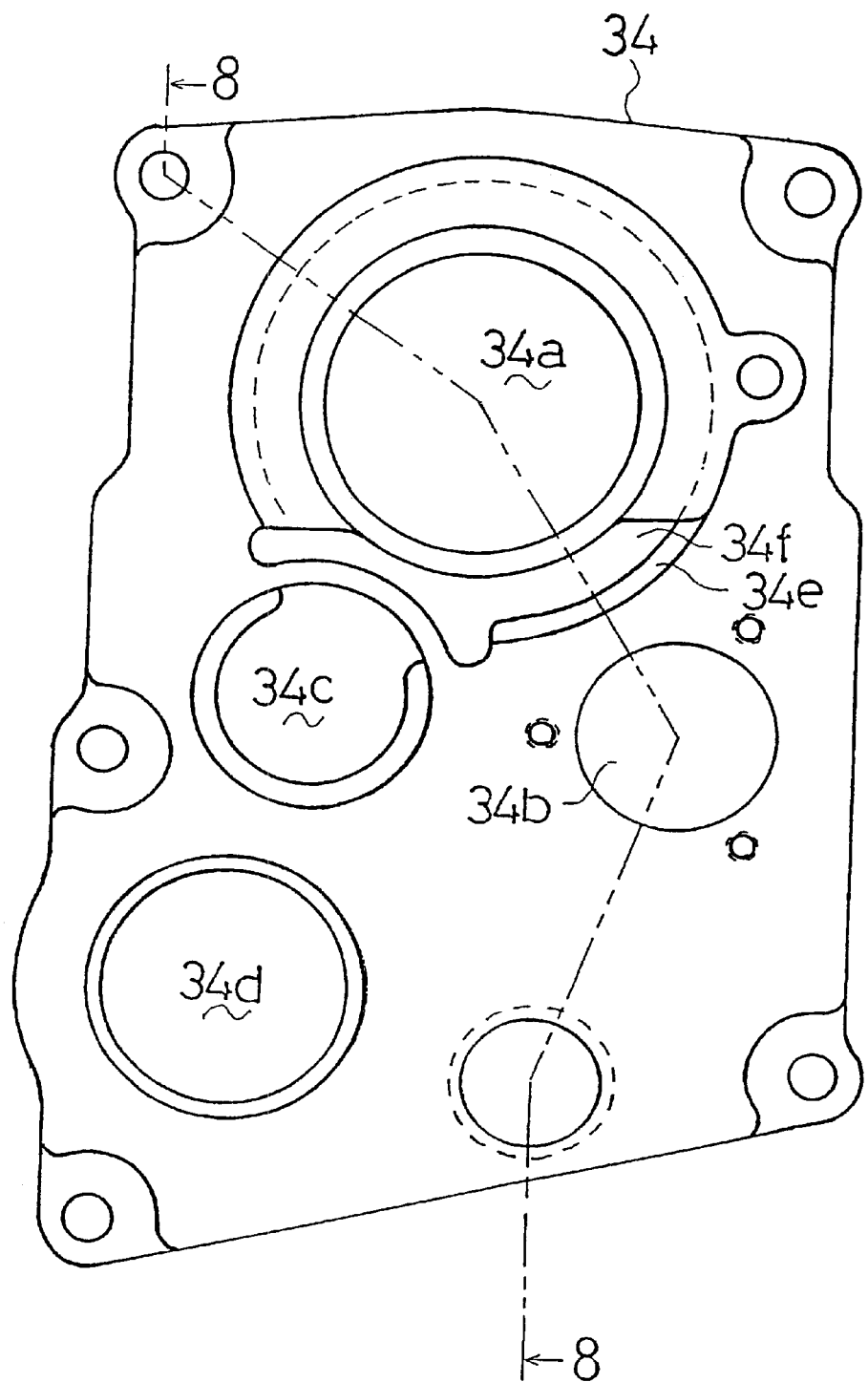
FIG. 7 is a rear view of partition wall 34.
Figure 8:
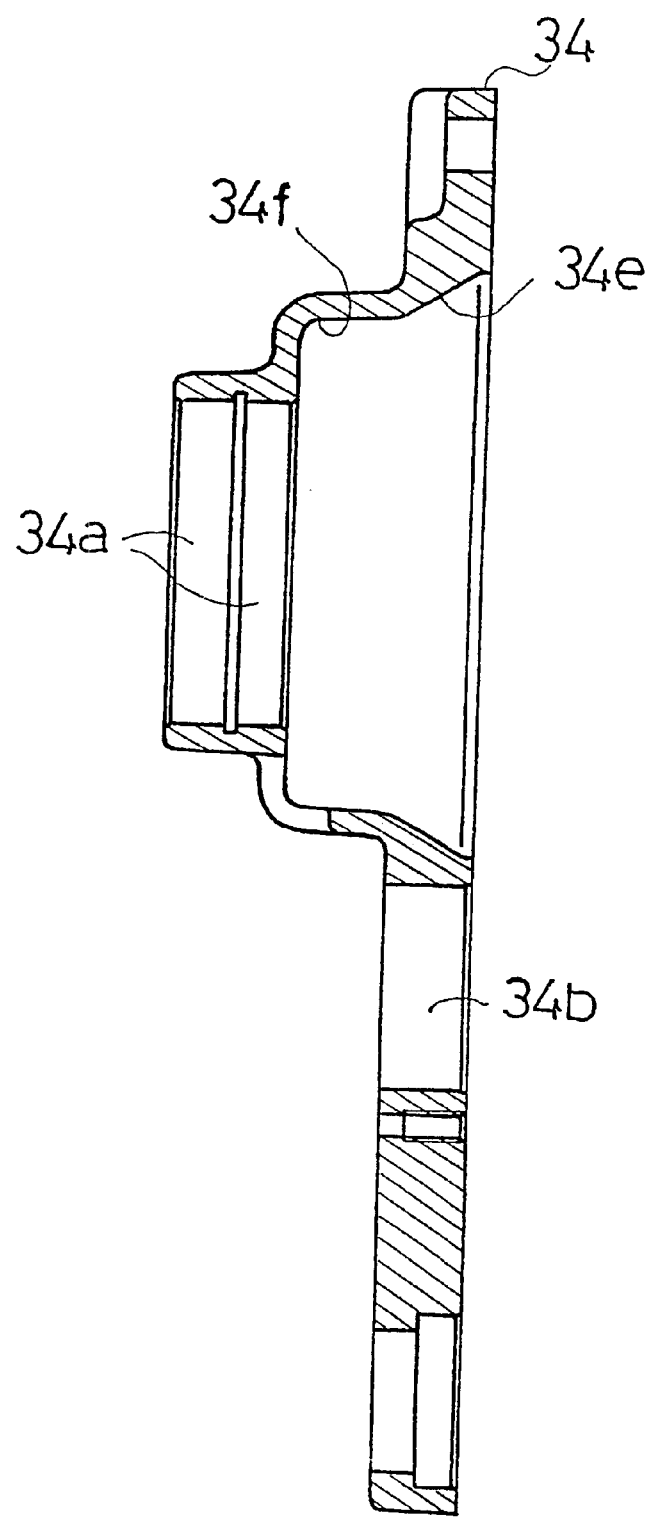
FIG. 8 is a cross sectional view taken along the lines 8—8 of FIG. 7.

As mentioned above, basically, the transmission mode is changed at the period when the output rotational speed (of first speed change output shaft 27) according to the HST mode coincides with the output rotational speed according to the HMT mode, i.e., if referring to FIG. 6, when shifted speed ratio setting lever 120 reaches mode change position X so that pump discharge amount Dp becomes amount Dp2 and that actual speed ratio V becomes mode change speed ratio Vx. However, during this change of transmission mode, there are generated an electric lag between computation by controller 100 and transmission of output signals to electromagnetic valves 105 and 106, and a mechanical lag for actual operation of electromagnetic valves 105 and 106 so as to engage and disengage hydraulic clutches 11 and 12. Accordingly, when the transmission mode is actually changed, the rotational speed according to the HST mode becomes considerably different from that according to the HMT mode so as to generate sudden speed variance attended with shock.

Figure 15:
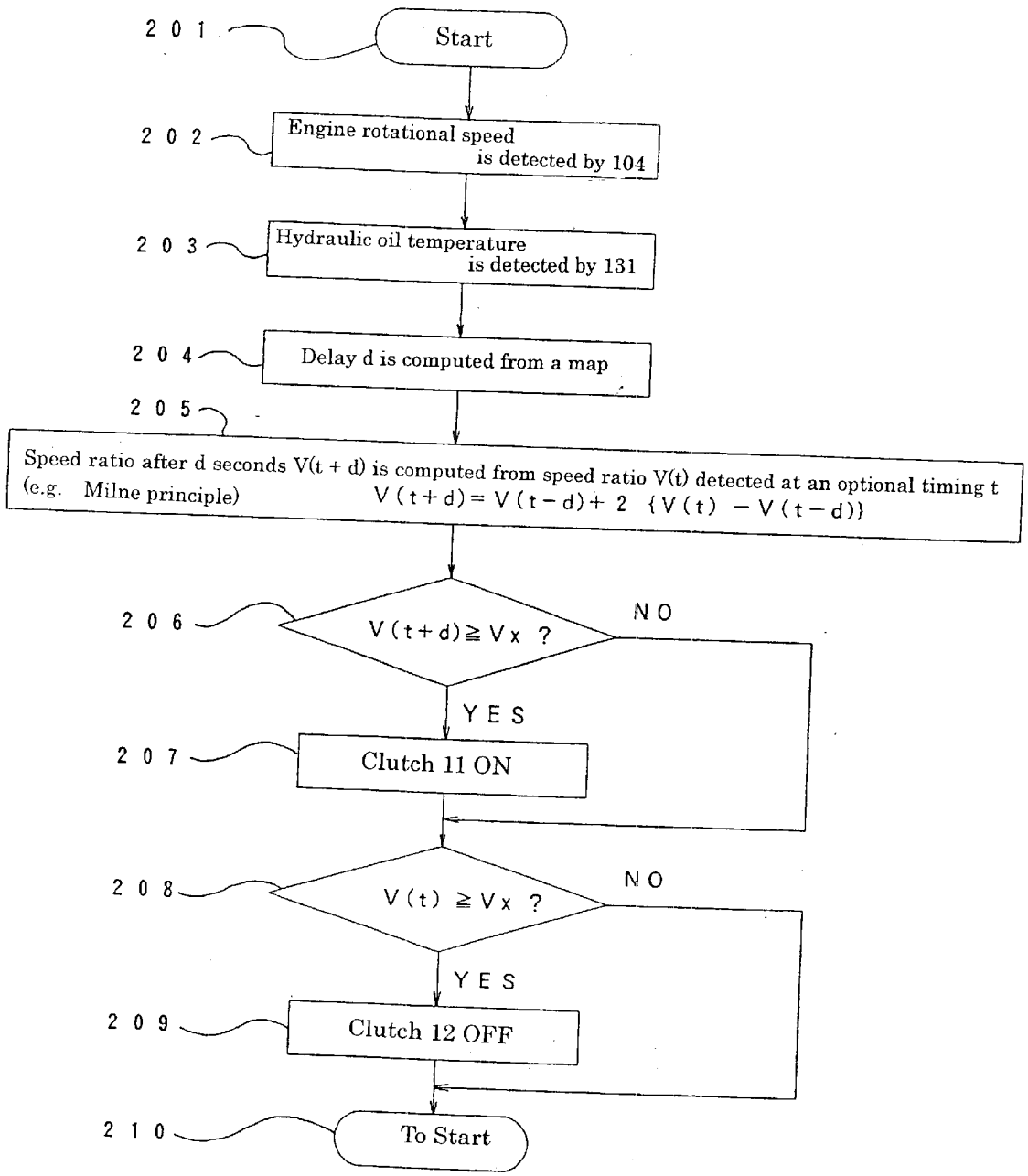
FIG. 15 is a flow chart of amendment of a period for changing the transmission mode in HMT 40.

Therefore, as shown in FIG. 15, the change period of transmission mode is amended in consideration of such lags.

At a starting process 201, engine 24 is driven so as to keep its constant rotational speed. This engine rotational speed is detected by input side rotational speed detector 104 shown in FIG. 9 (at a process 202). Furthermore, the temperature of hydraulic oil is detected by oil temperature sensor 131 of hydraulic oil tank 130 (at a process 203). Controller 100 stores a map of electric and mechanical turnaround time of clutches 11 and 12 corresponding to the hydraulic oil temperature and the engine rotational speed. The values detected as mentioned above are applied into this map so as to calculate a lag d (at a process 204).

At a process 205, a computer simulation is performed so as to calculate how much value an actual speed ratio V(t) at an optional speed ratio setting period t becomes after a time d (seconds), i.e., an estimated speed ratio V(t+d). In the embodiment of FIG. 11, the simulation is performed by the Milne principle. Alternatively, various simulation manners may be employed under counting lags d.

Next, at a conditional branch 206, estimated speed ratio V(t+d) computed during acceleration (in forward traveling low speed range FL) is compared with mode change speed ratio Vx. If speed ratio V(t+d) is not less than mode change speed ratio Vx (i.e., V(t+d)≧Vx), speed ratio V corresponding to the transmission mode change is reached before d seconds takes since period t. At this time, a process 207 for engaging clutch 11 is performed. Thus, gear 14 is driven by HST motor shaft 26 so as to begin to transmit the rotation of HST motor shaft 26 to second sun gear 4 of differential part 7.

Then, at a conditional branch 208, actual speed ratio V(t) and mode change speed ratio Vx are compared with each other whichever is larger, estimated speed ratio V(t+d) or mode change speed ratio Vx. If actual speed ratio V(t) is not less than mode change speed ratio Vx (i.e. V(t)≧Vx), in expectation of the time lag for actuation of clutch 11, a process 209 for disengaging clutch 12 is performed after time d passes since speed ratio setting period t. Consequently, the transmission from HST motor shaft 26 to first speed change output shaft 27 through gears 15 and 16 is interrupted.

Incidentally, if V(t+d) is less than Vx, process 207 is not performed so that clutch 11 remains being disengaged so as not to establish that only clutch 12 is disengaged, because V(t) is necessarily less than Vx.

Moreover, at conditional branch 208, if actual speed ratio V(t) is less than mode change speed ratio Vx (i.e., V(t)<Vx), clutch 12 remains being engaged. However, the running loop is broken at a final process 210 and returns to starting process 201 so that a next loop is performed. Thus, V(t) finally becomes not less than Vx so as to disengage clutch 12. Consequently, clutches 11 and 12 do not both remain being engaged.

The amendment of the mode change period during acceleration has been described. When the vehicle is decelerated from forward traveling middle speed range FM to forward traveling low speed range FL, it is all right only if criteria of conditional branches 206 and 208 are changed into "V(t+d)≦Vx?" and "V(t)≦Vx?" respectively.

FIG. 16 shows a computation of estimated speed ratio V(t+d) at optional period t during acceleration. While speed ratio setting lever 120 is shifted for acceleration, the voltage of position sensor 120a is detected time after time. At every optional detection period t, eliminated speed ratio V(t+d), which is reached by speed ratio V(t) after time lag d (seconds), is computed. The timing when speed ratio V(t) reaches mode change speed ratio Vx is referred to as a mode change timing Tx. At a period t1 from which it takes a longer time than time d (seconds) before mode change timing Tx, computed eliminated speed ratio V(t1+d) does not reach mode change speed ratio Vx. Therefore, clutch 11 is still disengaged (i.e., electromagnetic valve 105 remains off) and clutch 12 is still engaged (i.e., electromagnetic valve 106 remains on) so as to keep the HST mode.

At a period t2 from which it takes time d before mode change timing Tx, eliminated speed ratio V(t2+d) becomes mode change speed ratio Vx. At this time, clutch 11 is engaged (i.e., electromagnetic valve 105 is switched on) and clutch 12 is disengaged (i.e., electromagnetic valve 106 is switched off) so as to change the transmission mode into the HMT mode.

FIG. 16 shows the above-mentioned timing for switching respective clutches 11 and 12 during the mode change from the HST mode to the HMT mode in correspondence to the speed ratio setting period. In this regard, at period t1, clutches 11 and 12 remain off and on respectively, thereby keeping the HST mode. Then, at speed ratio detection period t2, eliminated speed ratio V(t2+d) becomes mode change speed ratio Vx. At this time, electromagnetic valve 105 for clutch 11 is switched on. When it takes time lag d since period t2, i.e., at a period t2+d, clutch 11 is perfectly engaged. In other words, before mode change period Tx, the output signal for actuation is transmitted to clutch 11 and clutch 11 approximately completes its actuation. Also, clutch 12 begins its actuation for disengagement almost since mode change period Tx. In this manner, time d ahead of mode change period Tx, at first, clutch 11 begins its actuation for engagement (if during deceleration, for disengagement). Then, since mode change period Tx, clutch 12 begins its actuation for disengagement (if during deceleration, for engagement). Consequently, speed ratio V becomes almost mode change speed ratio Vx while clutches 11 and 12 actuate (after clutch 11 completes its actuation) so that a difference of the output rotational speed is not generated between the pre-change of transmission mode and the post-change thereof, thereby preventing sudden variance of traveling speed of the vehicle.

Next, description will be given on a control for limiting this change of transmission mode. If speed ratio setting lever 120 is located at a position where mode change speed ratio Vx is obtained, and then, the vehicle travels under intensive variance of load, e.g., tractive load, the actual speed ratio (i.e., the ratio of the value detected by output side rotational speed detector 103 to the value detected by input side rotational speed detector 104) varies even when the load varies slightly, so that the change of transmission mode is automatically performed frequently, thereby increasingly stressing clutches 11 and 12 and the like, and continuously generating frequent vibration.

In order to solve this problem, the change of transmission mode is performed only when speed ratio setting lever 120 is actually operated. In other words, even when the load variation results in the variance of actual speed ratio, the transmittion mode is not changed, i.e., the current transmittion mode is kept, unless the position of speed ratio setting lever 120, i.e., the voltage from position sensor 120a changes. Due to this control, the vehicle like a tractor in traction, which travels under frequently varying load, can be stabilized in its travel without frequently automatic change of transmission mode.

Figure 17:
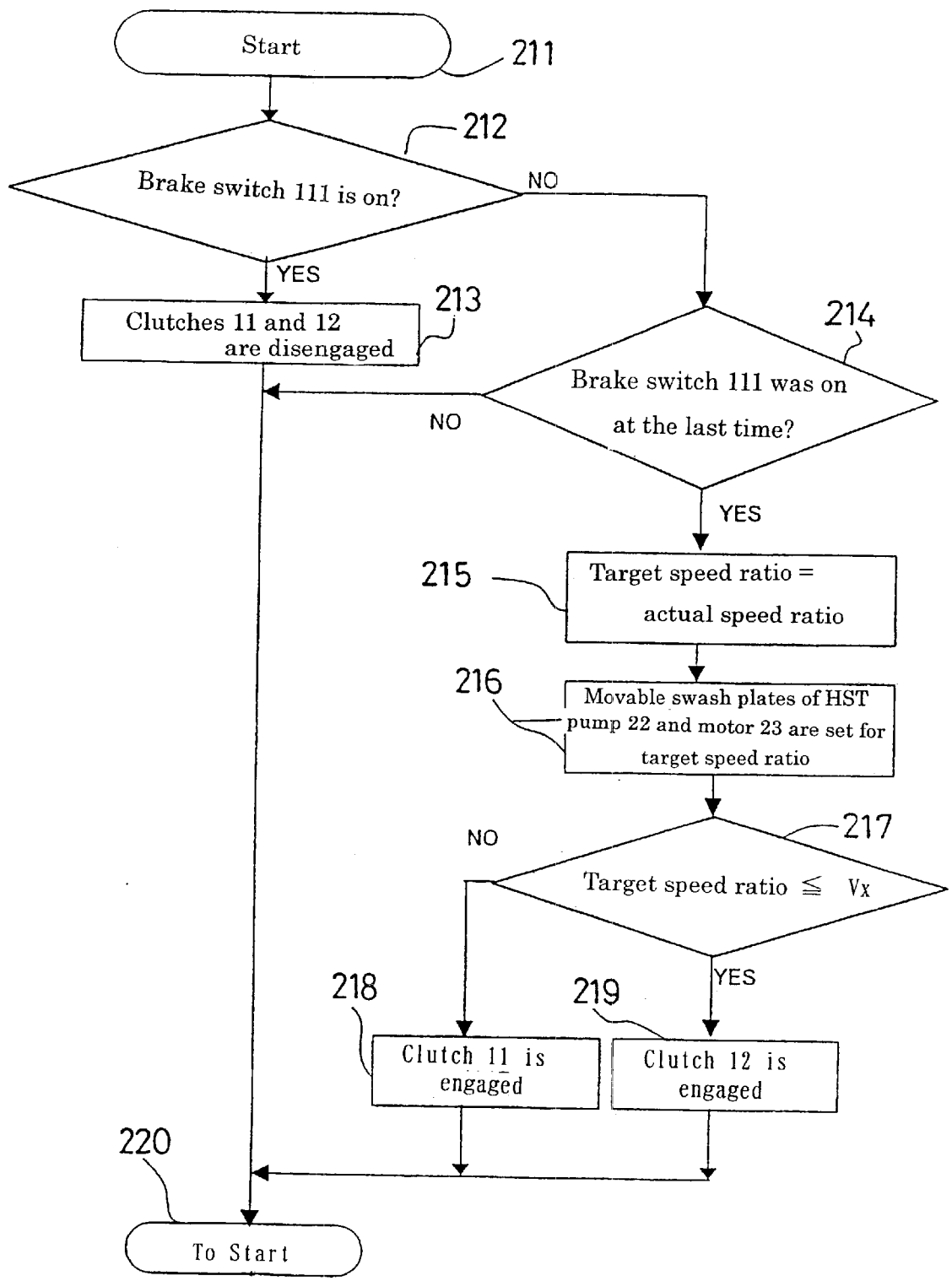
FIG. 17 is a flow chart of control of clutches 11 and 12 and HST 21 during braking and releasing the brake.

Next, description will be given on the engagement and disengagement of clutches 11 and 12 (and clutch 13, if HMT 40' is used), which is controlled in connection with the active condition of a brake, according to FIG. 17.

Firstly, at a conditional branch 212, controller 100 judges whether brake switch 111 is on or off (i.e., whether brake pedal 140 is pressed or not). If brake switch 111 is on (brake pedal 140 is pressed), either clutch 11 or 12 which has been engaged is disengaged. In detail, when the transmission mode is the HST mode, engaged clutch 12 is disengaged. When the transmission mode is the HMT mode, engaged clutch 11 is disengaged. Consequently, both clutches 11 and 12 are disengaged. (Incidentally, if HMT 40' is used and the transmission mode is the mechanical drive mode, clutch 13 is disengaged.)

Accordingly, first speed change output shaft 27 and second speed change output shaft 28, which is braked by brake 18 while engaging with first speed change output shaft 27 through gears, are shut off from the power transmitted from either HST motor shaft 26 or carrier 6 of differential part 7 (from input shaft 25 toward braked second speed change output shaft 28 in the mechanical drive mode of HMT 40') so that the driving force does not conflict the braking operation. Consequently, the braking effect is excellently generated and clutches 11 and 12 (and 13) can be prevented from being wasted, thereby being improved in its endurance.

On the other hand, at conditional branch 212, when an on-signal from brake switch 111 is not detected, the process is advanced to a conditional branch 212, wherein the result of preceding detection of brake switch 111 (preceding conditional branch 212) is judged. If the on-signal of brake switch 111 is not detected at the last time, it is decided that brake pedal 140 remains unpressed, whereby a final process is reached so as to break the running loop, and continuously, the next loop starts from a starting process.

If an on-signal of brake switch 111 is detected at preceding conditional branch 212, i.e., if the on-signal of brake switch 111 is not detected in the running loop but detected in the preceding loop, this condition means that pressed brake pedal 140 is released. Then, at a process 215, the actual speed ratio is detected and adjusted to agree with the target speed ratio. Further, at a process 216, the slant angles of hydraulic pump 22 and motor 23 are analyzed from this target speed ratio. Controller 100 controls the slant angles of hydraulic pump 22 and motor 23 through pump-and-motor swash plate control devices 121 and 122. Then, at conditional branch 217, the target speed ratio is compared with mode change speed ratio Vx. If the target speed ratio is not less than mode change speed ratio Vx, a process 218 for engaging clutch 11 is performed so as to establish the HMT mode. If the target speed ratio is less than mode change speed ratio Vx, a process 219 for engaging clutch 12 is performed so as to establish the HST mode.

In this manner, if the brake is released in the isolation condition of the transmission by disengaging clutches 11 and 12, the set speed ratio is adjusted to agree with the actual speed ratio, and then, an appropriate one is chosen between the HST mode and the HMT mode. Afterwards, clutch 11 or 12 is engaged again so as to enable power to return smoothly. Furthermore, the component parts such as clutches 11 and 12 are improved in their endurance because the shock thereto can be reduced.

Description will now be given on an amendment of a speed variance ratio with adjustment of the discharge amount of hydraulic pump 22 and hydraulic motor 23 of HST 21. In the above-mentioned basic control of speed ratio as shown in FIG. 10, pump discharge amount Dp and motor discharge amount Dm are sequentially varied in relation to the shift of speed ratio setting lever 120. In rearward traveling middle speed range RM and forward traveling high speed range FH, only movable swash plate 23a of hydraulic motor 23 is moved. Between rearward traveling low speed range RL and forward traveling middle speed range FM, only movable swash plate 22a of hydraulic pump 22 is moved. If the vehicle is going to be suddenly accelerated or decelerated over a plurality of speed ranges in this construction, e.g., even if speed ratio setting lever 120 is shifted from a position A in forward traveling high speed range FH to a position B in forward traveling middle speed range FM, a long time is spent for speed change, thereby being attended with discomfort.

Therefore, when speed ratio setting lever 120 is shifted over two or more speed ranges, e.g., when shifted from forward traveling middle speed range FM to forward traveling high speed range FH, or from rearward traveling low speed range RL to forward traveling low speed range FL, both pump swash plate control device 121 and motor swash plate control device 122 are controlled so as to operate both swash plates 22a and 23a simultaneously.

When speed ratio setting lever 120 to be shifted at one stroke from position A to position B, for example, arrives at position B, position sensor 120a detects position B as a target speed ratio position. Controller decides that lever 120 is shifted between two speed ranges of forward traveling high speed range FH and forward traveling middle speed range FM. Then, motor swash plate control device 122 is operated to rotate movable swash plate 23a so that motor discharge amount Dm becomes maximum amount Dm2. Simultaneously, pump swash plate control device 121 is also operated to rotate movable swash plate 22a to an angle corresponding to position B.

Incidentally, in such a speed change over a plurality of speed ranges, speed ratio setting lever 120 may be shifted across mode change position X, e.g., it may be shifted from a position C in forward traveling low speed range FL to position A in forward traveling high speed range FH. In this case, if position A detected by position sensor 120*a* is decided as the target speed ratio position, the change of transmission mode is performed in addition to the simultaneous operation of both movable swash plates 22*a* and 23*a*, whereby component parts such as clutches 11 and 12 are greatly shocked.

Therefore, in such a case, at first, mode change speed ratio Vx is input as a provisional target speed ratio position into controller 100 so as to change the transmission mode. After the change of transmission mode is completed, target speed ratio position A is input so as to operate movable swash plates 22*a* and 23*a* simultaneously, thereby establishing the speed ratio corresponding to position A. In brief, when the shift is performed across mode change position X, the simultaneous operation of movable swash plates 22*a* and 23*a* is performed after the change of transmission mode, thereby enabling a speed change without a shock.

The flow of the foregoing speed change over a plurality of speed ranges will be described in accordance with FIG. 18.

Firstly, at a conditional branch 222, a speed ratio setting position (a target speed ratio position), at which shifted speed ratio setting lever 120 arrives, is detected so that controller 100 decides whether te shift is performed across mode change position X or not. If mode change position X is not crossed, the change of transmission mode is unnecessary. Therefore, at a process 224, regarding the detected speed ratio as the target speed ratio, movable swash plates 22*a* and 23*a* of hydraulic pump 22 and motor 23 are simultaneously operated for speed change.

On the other hand, if controller 100 decides that the shift is performed across transmission mode change position X, a process 223 is performed so that controller 100 determines mode change speed ratio Vx as a provisional target speed ratio. Then, at a conditional branch 225, controller 100 judges whether the current timing comes to be correspondent to the change of transmission mode, i.e., whether the actual speed ratio (which is detected by both rotational speed detectors 103 and 104) becomes mode change speed ratio Vx or not (including the case where the above-mentioned amendment of timing). If the change of transmission mode is decided to be impossible (i.e., if it is a timing when the change of transmission mode generates a difference of the rotational speed), a waiting loop 226 repeats. Then, when it is finally decided that the mode change becomes possible, a process 227 is performed so as to change the transmission mode. Continuously, a process 228 is performed so that the speed ratio pointed by shifted speed ratio setting lever 120 is set as the target speed ratio and hydraulic pump 22 and motor 23 are simultaneously operated, thereby establishing sudden acceleration or deceleration.

In the foregoing control, on the basis of the control of hydraulic pump 22 and motor 23 and the transmission mode change, the degree of acceleration and deceleration is increased in correspondence to the shift of speed ratio setting lever 120 over a plurality of speed ranges. Moreover, it is important that the target speed ratio is set in correspondence to the stroke of speed ratio setting lever 120 for improvement of operational feeling (i.e., for obtaining desirable traveling speed or acceleration or deceleration).

Figure 19:
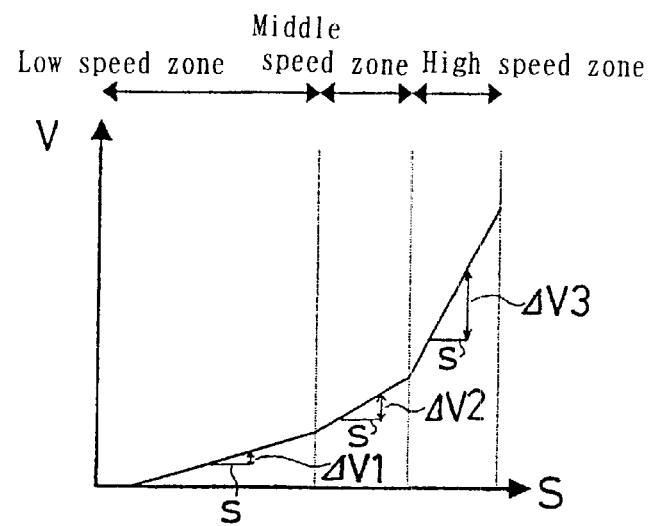
FIG. 19 is a graph of a set speed ratio in relation to a voltage issued from a position sensor 120a of speed ratio setting lever 120.

Referring to FIG. 19, a graph of target speed ratio V (in this embodiment, during forward traveling) in relation to an input voltage S from position sensor 120*a* for detecting a position of speed ratio setting lever 120 is memorized for obtaining a good operational feeling. In this regard, when speed ratio setting lever 120 is shifted from the stationary position to the minimum (forward traveling) speed ratio position, a variance ratio of target speed ratio V (i.e., a variance ratio ΔV) is not held constant but it is held down in a (forward traveling) low speed range and raised in a (forward traveling) high speed range, while it is set in-between in a (forward traveling) middle speed range.

If target speed ratio V is increased in the whole speed range from the stationary position to the maximum speed ratio position while an increase ratio ΔV1 (i.e., the increasing or decreasing degree of speed ratio V every unit of stroke s of speed ratio setting lever 120 or every voltage variance of position sensor 120*a*) corresponding to the low speed range is constantly held, speed ratio setting lever 120 must be shifted in an extremely long stroke. On the contrary, if an increase ratio ΔV3 is fixed, and then, the vehicle travels at a low speed for a ground work or the like, even a slight stroke generates a great variance of speed ratio, thereby preventing a delicate speed regulation. Therefore, the variance ratio of target speed ratio to the stroke is made befitting each of the speed ranges so as to improve the operational feeling of speed ratio setting lever 120. Consequently, the difference generated between the operation by an operator and an actually obtained speed can be restricted.

In detail, the low speed range is often set when the vehicle travels at work like a ground work, or when the vehicle is going to be housed. Then, if the variance ratio of speed ratio to the stroke of speed ratio setting lever 120 (i.e., to the variance of input voltage s from position sensor 120*a*) is too large, the traveling speed varies beyond expectation, thereby resulting in a rough work. Therefore, variance ratio ΔV1 of target speed ratio in this speed range is held down.

In the middle speed range, a considerable increase or decrease of speed ratio in relation to the stroke of speed ratio setting lever 120 is desired. If the variance ratio used in the low speed range is still held, acceleration falls short of expectation. Therefore, variance ratio ΔV2 of target speed ratio in this speed range is set to be larger than variance ratio ΔV1 for the low speed range.

The high speed range is set when the vehicle normally travels on a road. In this condition, greatly large acceleration and deceleration in relative to the stroke of speed ratio setting lever 120 is desired. Therefore, variance ratio ΔV3 of target speed ratio is set to be further large.

For the present, the low, middle and high speed ranges set as shown in FIG. 19 are not concerned with forward traveling low speed range FL, forward traveling middle speed range FM and forward traveling high speed range FH which correspond to the above-mentioned control (shown in FIG. 10) of hydraulic pump 22 and motor 23 and the change of transmission mode.

For example, if the HMT mode is set in the whole speed range from the stationary position to the maximum speed ratio position, and movable swash plate 22*a* of hydraulic pump 22 is slanted toward its rotational range for rearward traveling through the whole speed range as speed ratio setting lever 120 is shifted toward the forward traveling range, the degree of variance of output value for controlling pump swash plate control device 121 in relation to the stroke of speed ratio setting lever 120 is changed every speed range. In this regard, the output value is held down in the low speed range. It is rather large in the middle speed range, and further raised in the high speed range.

This control can be also applicable to a continuously variable transmission which is not an HMT but has only an HST. In this regard, if the discharge amount between hydraulic pump and motor in the HST (i.e., a movable swash plate for changing this discharge amount) can be electrically controlled, the degree of angle of the swash plate swash plate in variance can be set variously, thereby enabling the increase and decrease ratio of speed ratio to be varied.

Further referring to FIG. 19, the variance ratio of speed ratio is constant in each of the low, middle and high speed ranges. However, any other manner than such a classification may be employed. All to be required is that the speed ratio is set so as to befitting each optional speed ratio position pointed by speed ratio setting lever 120. The change of variance ratio of speed ratio is only a result of this speed ratio setting.

By using HMT 40 with such a control as shown in FIG. 10, the relationship between the position of speed ratio setting lever 120 and the target speed ratio as shown in FIG. 19 may be obtained. In this regard, in forward traveling low speed range FL, pump discharge amount P is changed (i.e., movable swash plate 22a is operated) under the HST mode, thereby enabling small variance ratio ΔV1 of target speed ratio to be obtained. In forward traveling middle speed range FM, pump discharge amount P is changed (i.e., movable swash plate 23a is operated) under the HMT mode, thereby enabling rather large variance ratio ΔV2 to be obtained. In forward traveling high speed range FH, motor discharge amount M is changed under the HMT mode, thereby enabling extremely large variance ratio ΔV3 to be obtained.

Figure 20:
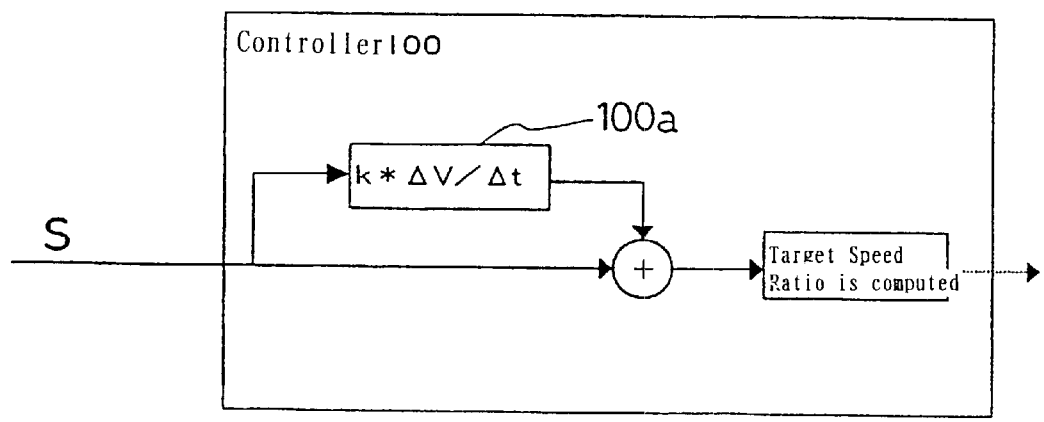
FIG. 20 is a block diagram showing the control for amendment of the target speed ratio correspondingly to the shift speed of speed ratio setting lever 120.

Referring to FIG. 20, a shift speed (operation speed) of speed ratio setting lever 120 is computed and the target speed ratio is amended in correspondence to the operation speed so that a target speed ratio larger than an actual speed ratio is set as a provisional target speed ratio. Accordingly, variance ratio of speed in acceleration and deceleration can be increased by shifting lever 120 faster. This control as well as the foregoing control is applicable to a structure such that the pointed value of speed ratio is electrically detected and a movable swash plate of an HST for changing a speed ratio is variously changed in its rotational speed. Also, this is applicable to a continuously variable transmission having only an HST as well as HMT 40.

In the above-mentioned basic controlling structure as shown in FIG. 19, a speed ratio corresponding to the actual position of speed ratio (input voltage s from position sensor 120a) every moment is input as a target speed ratio V into controller 100. During the shift, target speed ratio V is continuously input. The final position reached by lever 120 is a final target speed ratio. Accordingly, even if speed ratio setting lever 120 is shifted fast, the increase of speed ratio falls short of expectation unless shifted lever 120 reaches a certain position.

In this embodiment, controller 100 is provided with a target speed amendment circuit 100a as shown in FIG. 20. This circuit 100a reads a variance of input voltage s from position sensor 120a of speed ratio setting lever 120 and calculate the degree thereof every unit time, i.e. a variance speed of target sped ratio (i.e., ΔV/Δt). This is multiplied by a coefficient k (k*ΔV/Δt) to serve as amended target speed ratio V. This amended value is increased as the variance speed of target speed ratio V is increased, i.e., as the shift of speed ratio setting lever 120 is faster.

Then, the amended value (k*ΔV/Δt) is added to the target speed ratio read from the input voltage. Aiming at the result of this addition, controller 100 outputs to the actuators for controlling a speed ratio (i.e., pump-and-motor swash plate control devices 121 and 122 or electromagnetic valves 105 and 106). Consequently, when a speed ratio which is larger than the present value set by speed ratio setting lever 120 is desired, and even if the target speed ratio setting position is far from the existing position of speed ratio setting lever 120, lever 120 is shifted a little but fast so as to set a larger provisional target speed ratio, thereby enabling an actual speed ratio to approach the provisional target speed ratio before lever 120 reaches the target position. Consequently, the actual speed ratio can early reach the final target speed ratio.

Figure 18:
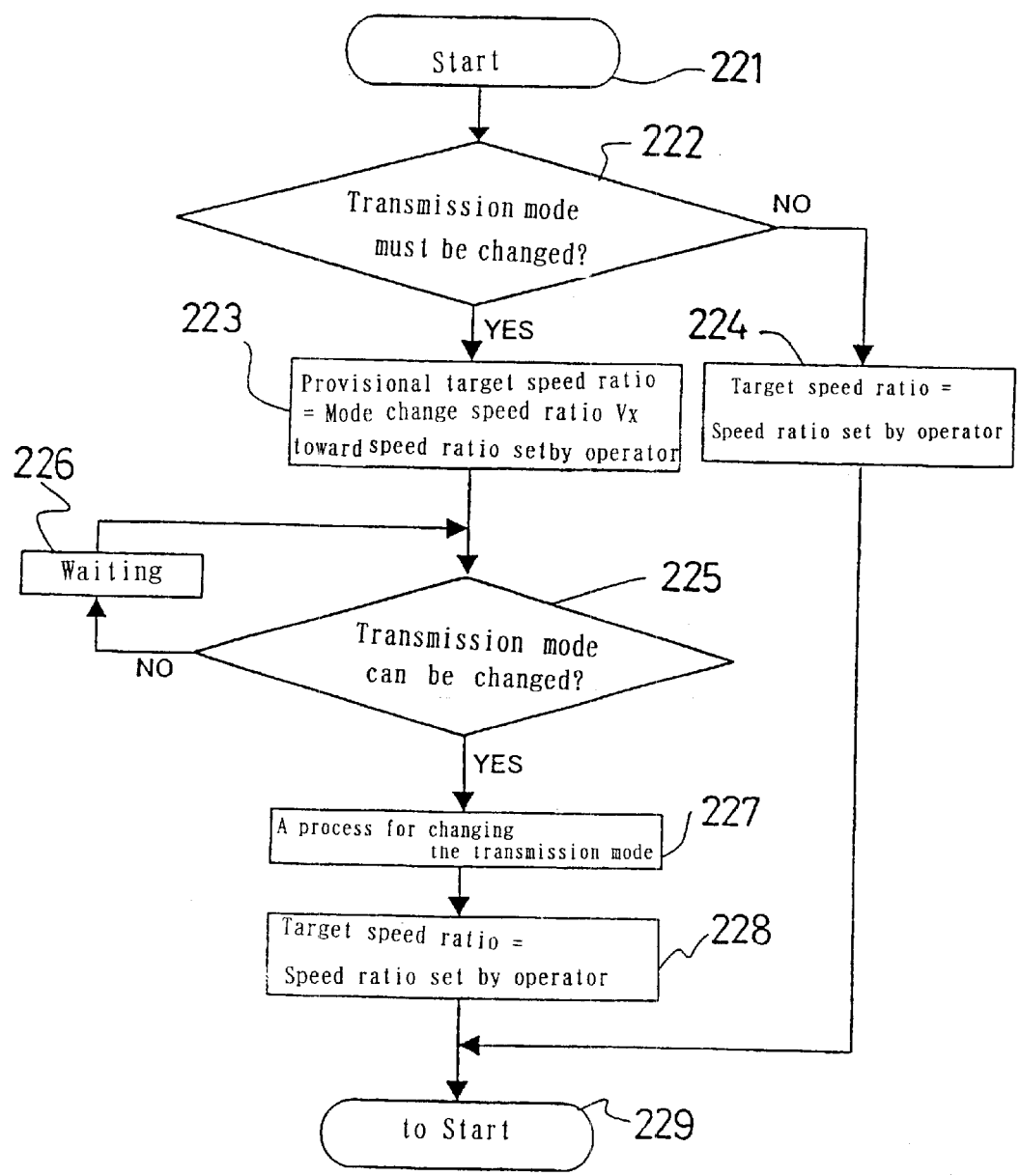
FIG. 18 is a flow chart of amendment of a target speed ratio in relation to the shift of a speed ratio setting lever 120, wherein the target speed ratio is amended when the lever is shifted across the change point of transmission mode.

If this control system is employed by an HMT, such a control of acceleration and deceleration over different speed ranges as shown in FIG. 18 may be also adopted. For example, when the vehicle accelerates from an optional position in forward traveling middle speed range FM, and even if speed ratio setting lever 120 during this shift is still in forward traveling middle speed ratio FM, the shift speed is so increased as to enable the provisional target speed ratio to be set in forward traveling high speed ratio so that both movable swash plates 22a and 23a of hydraulic pump 22 and motor 23 are operated simultaneously, thereby increasing the variance ratio in acceleration and deceleration.

Figure 21:
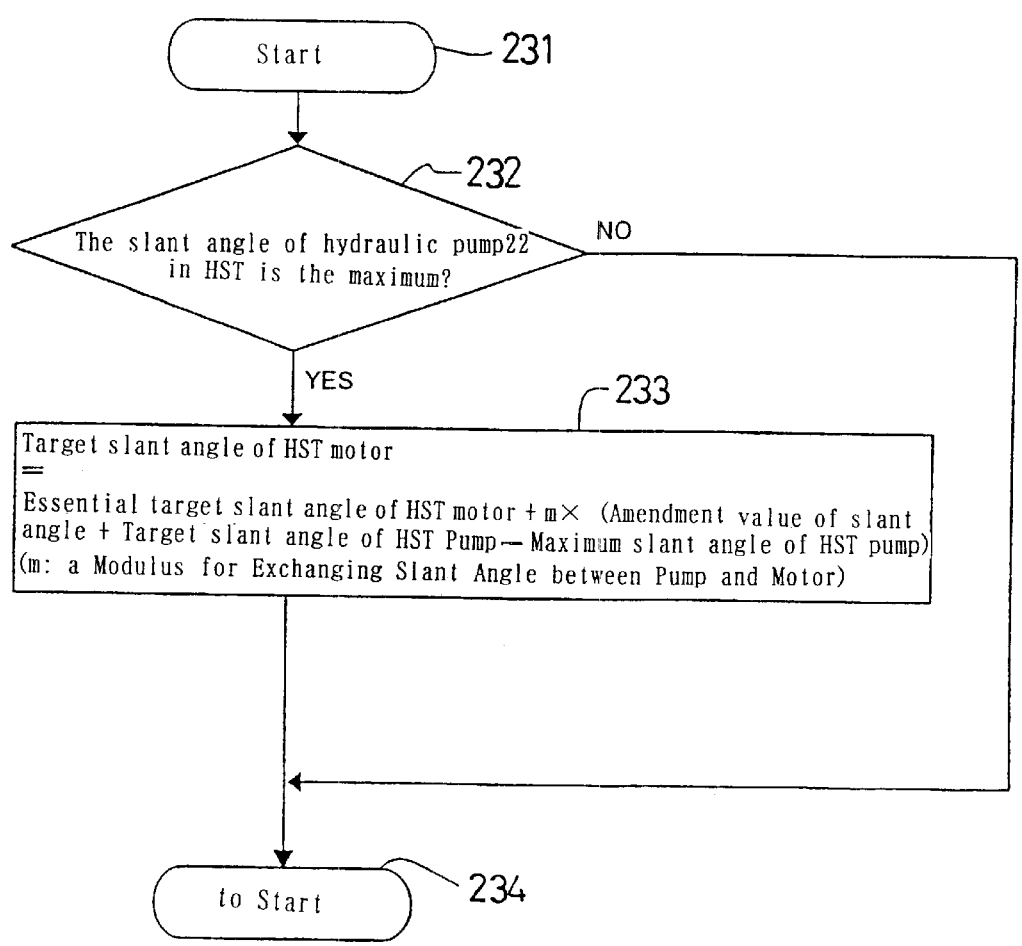

Next, referring to FIG. 21, description will be given on amendment of volumetric efficiency shared between hydraulic pump 22 and hydraulic motor 23 in HST 21 for diminishing the difference between the set (target) speed ratio and the actual speed ratio caused by variance of load.

Since HST 21 is varied in its volumetric efficiency by variance of load, it happens that the traveling speed of the vehicle falls short of expectation in however stroke speed ratio setting lever 120 is operated so as to control hydraulic pump 22 and motor 23. Therefore, in the case where the set speed ratio corresponding to the position of speed ratio setting lever 120 is considerably different from the actual speed ratio, the pump-or-motor discharge amount is adjusted so as to coincide the actual speed ratio with the set speed ratio.

The flow of this control will be described in accordance with FIG. 21. First, this control flow starts (from the starting process 231) in the case where the actual speed ratio computed basing on the detection of rotational speed detectors 103 and 104 is different from the set speed ratio detected by position sensor 120a.

At a conditional branch 232, it is judged whether the slanting angle of movable swash plate 22a of hydraulic pump 22 is the maximum. If movable swash plate 22a is out of the maximum slanting angle, pump swash plate control device 121 is commanded to adjust pump discharge amount Dp with tilting movable swash plate 22a, thereby amending the speed ratio. On the other hand, at conditional branch 232, when movable swash plate 22a is detected to be at the maximum slanting angle, a process 233 is performed so as to compute a target slanting angle of movable swash plate 23a of hydraulic motor 23 and command motor swash plate control device 122 to tilt movable swash plate 23a for adjusting motor discharge amount Dm, thereby amending the speed ratio.

In such a manner, when the actual speed ratio becomes different from the set speed ratio because of variance of load or so on, the actual speed ratio is amended by controlling movable swash plate 22a, if hydraulic pump 22 can be used for this amendment (i.e., unless movable swash plate 22a reaches its maximum slant angle). After movable swash plate 22a reaches the maximum slanting angle, movable swash plate 23a of hydraulic motor 23 inherits the amendment of speed ratio therefrom. Consequently, even if the speed ratio setting position is adjacent to position Y or Z as shown in FIG. 10, the amendment of speed ratio is inherited between pump swash plate control device 121 and motor swash plate control device 122, thereby reducing shock and uncomfortableness attended with the amendment of speed ratio.

Figure 22:
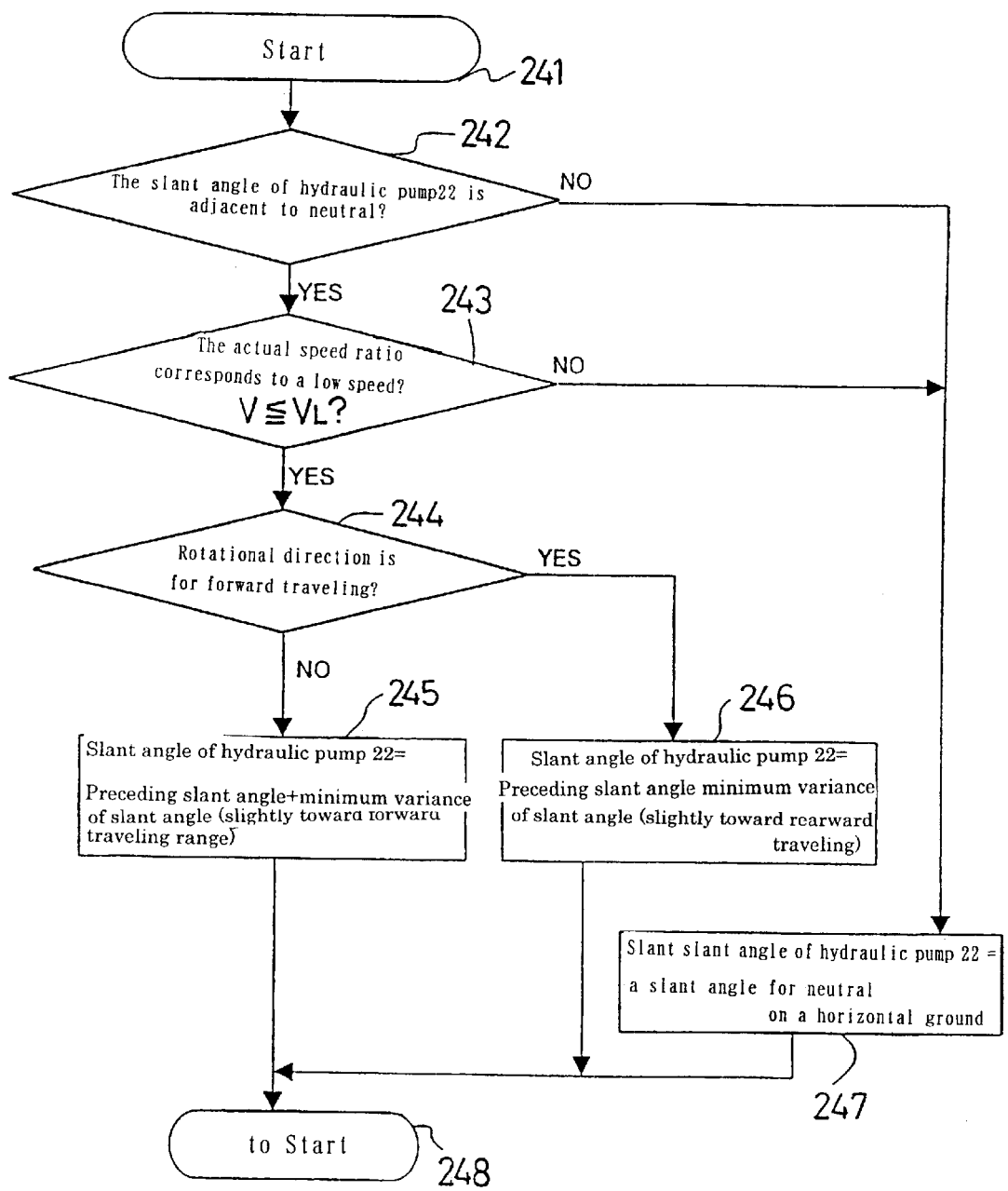
FIG. 22 is a flow chart of control of HST 21 when the speed ratio is set to zero.

Next, description will be given on the control of the HST when speed ratio setting lever 120 is set to stationary position N in accordance with a flow chart shown in FIG. 22. Incidentally, this control system can be also adopted by a continuously variable transmission consisting of only an HST, as well as an HMT.

If a traveling vehicle is going to be stopped, speed ratio setting lever 120 is set to stationary position N. Controller 100, when detecting that the voltage issued from position sensor 120a corresponds to stationary position N, judges whether movable swash plate 22a of hydraulic pump 22 of HST 21 is adjacent to its neutral position or not (i.e., the slanting angle thereof is approximately a degree of zero) at a conditional branch 242.

Then, if movable swash plate 22a is not at its neutral position, a process 247 is performed so that pump swash plate control device 121 is operated to bring movable swash plate 22a to the neutral position (adjust its slant angle to 0 degree). The running loop is broken at an end 248 and the next loop starts from a start 241. On the other hand, at conditional branch 242, if speed ratio setting lever 120 is detected to be adjacent to the stationary position, a process is advanced to a conditional branch 243 wherein it is judged whether the speed ratio corresponds to low-speed-traveling (i.e., $V \leq V_L$? hereinafter, the speed ratio in this range is referred to as an "extremely low speed ratio"). If the extremely low speed ratio ($V \leq V_L$), the direction of first speed change output shaft 27 in rotation is ascertained by output side rotational speed detector 103 at a conditional branch 244.

Then, if the rotational direction is normal (a rotation for forward traveling), movable swash plate 22a is tilted toward its rearward traveling range side at the minimum variable angle (the minimum adjustable unit of slant angle of movable swash plate 22a by pump swash plate control device 121). If the rotational direction of first speed change output shaft 27 is reverse (a rotation for rearward traveling), a process 245 is performed so that pump swash plate control device 121 is operated to tilt movable swash plate 22a toward its forward traveling range side at the minimum variable angle. Incidentally, the direction of the movable swash plate toward the maximum angle for forward traveling is positive, and its opposite direction is negative.

The running loop passing either process 245 or 246 is broken at end 248 and the next loop starts from start 241 so that the above-mentioned flow is repeated. For example, the vehicle traveling forwardly at an extremely low speed is decelerated and stops according to process 246 wherein hydraulic motor 23 is slightly driven for rearward traveling, and then, the vehicle tends to travel rearwardly at an extremely low speed. However, because of conditional branch 245 in the next loop, hydraulic motor 23 is slightly driven for forward traveling at this time. The vehicle is decelerated again and stops, and then tends to travel forwardly. Due to this repetition of loop, movable swash plate 22a repeats its small reciprocal movements between its forward-and-rearward traveling range sides at the minimum movable angle, thereby keeping the vehicle itself stationary.

Accordingly, the stationary vehicle can be held even on a slope because power is transmitted into first speed change output shaft 27. If speed ratio setting lever 120 is operated again to an optional speed ratio setting position for either forward or rearward traveling, clutching and other operations are not required, thereby diminishing a delay in starting of the vehicle so as to improve the operational feeling.

Figure 23:
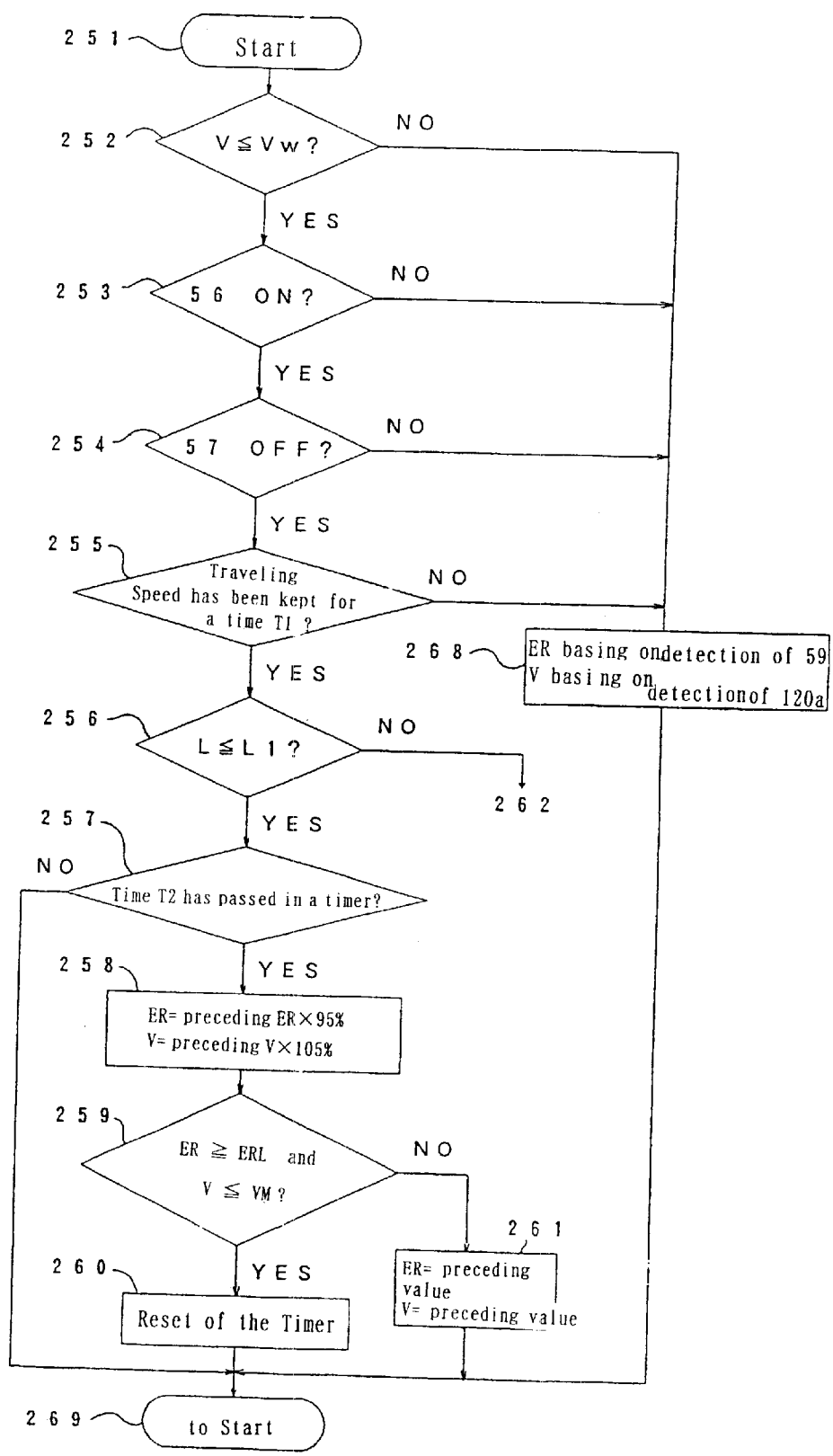
FIG. 23 is a flow chart of control a relation between engine rotation regulation and HMT speed ratio regulation.
Figure 24:
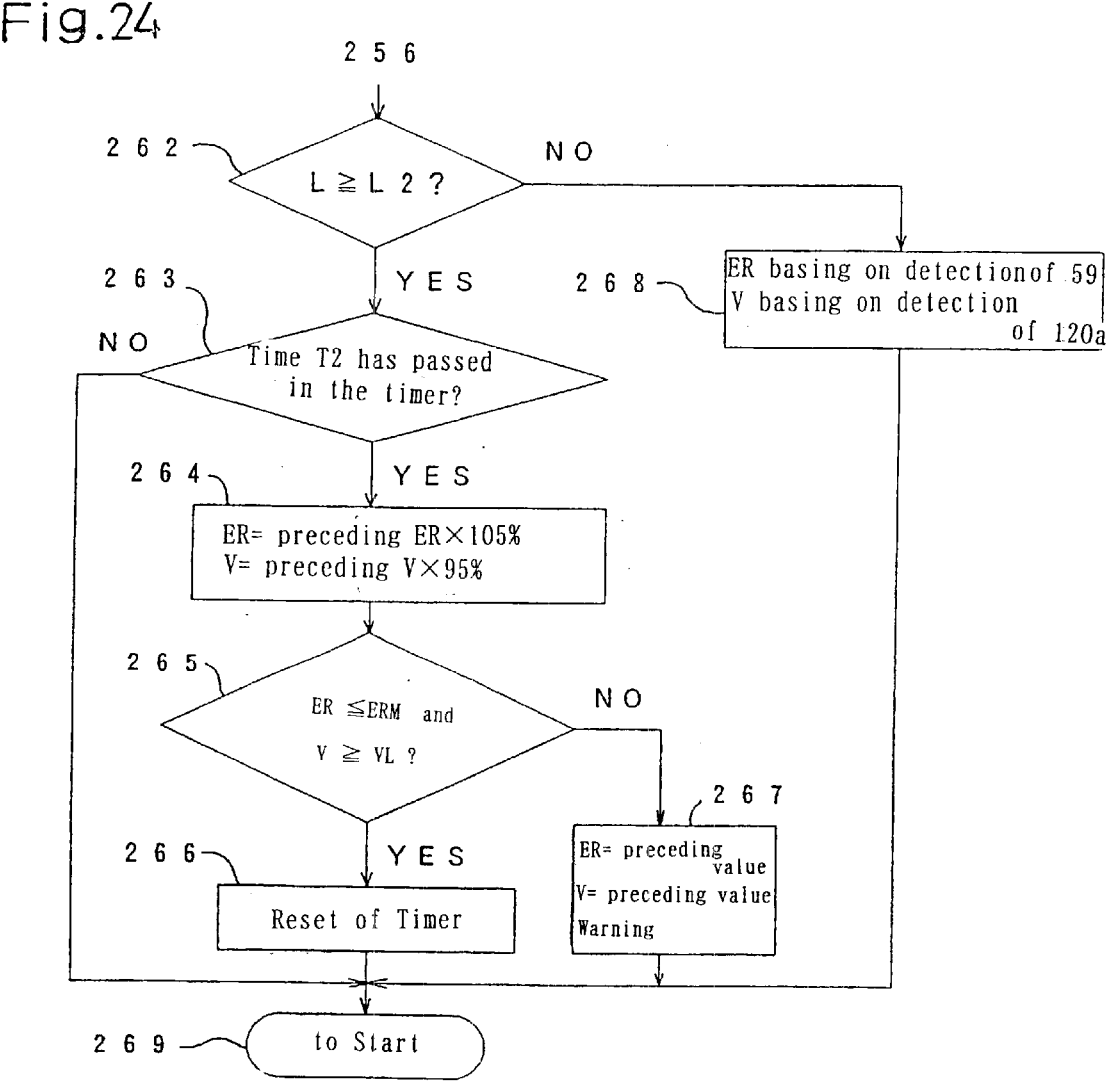
FIG. 24 is a flow chart of a part of the same.

Next, referring to FIGS. 9, 23 and 24, description will be given on the output control of HMT 40 in connection with an engine rotational speed control set in a load control mode.

As shown in FIG. 9, PTO switch 57 for switching on-and-off electromagnetic valve 107 as an actuator for a PTO clutch 41 is connected to controller 100.

Also, a load control mode switch 56, an engine rotation controller (an electric governor) 58 and an accelerator sensor 59 as means for determining an engine rotational speed are connected to controller 100.

The output rotational speed of engine 24 is controlled by engine rotation controller (electric governor ) 58, normally, so as to agree with the set rotational speed thereof detected by accelerator sensor 59. However, when load control mode switch 56 is switched on, it is set into the load control mode, wherein load applied on engine 24 (an engine load ratio L which becomes 100% when the output of engine 24 reaches the maximum endurable value) is detected and entered into controller 100, and controller 100 issues a command signal to engine rotation controller 58 if necessary on deciding from average engine load ratio L, thereby increasing or decreasing engine rotational speed ER.

In other words, if detected engine load ratio L is larger than a certain value so that engine 24 is determined to be under excessively heavy load, actual engine rotational speed ER is increased more than the rotational speed determined by the accelerator (or the rotational speed set according to the preceding load detection) so as to obtain the output rotation endurable against the load. On the contrary, if the engine load ratio is small so that engine 24 is determined to be under light load, the engine rotational speed is lowered than the present speed so as to reduce the noise generated from the engine rotation and to save the wast engine output and improve the fuel expenses.

However, the traveling speed is determined as engine rotational speed ER multiplied by speed ratio V. When speed ratio V established by a transmission is held constant, the variation of engine rotational speed ER results in the variation of traveling speed. If speed ratio V in the transmission is increased and decreased in correspondence to the increase and decrease of engine rotational speed ER, the traveling speed can be held. However, such a control is difficult in a mechanical transmission.

In HMT 40 of the present invention which is continuously variable, speed ratio V can be easily changed by tilting movable swash plate 22a of hydraulic pump 22 or movable swash plate 23a of hydraulic motor 23. Then, the control of speed ratio in HMT 40 is combined with the control of engine rotational speed according to the load control mode in engine rotation controller 58 so that the traveling speed can be held while the engine rotational speed is varied. For example, for reducing engine rotational speed ER, movable swash plate 22a or 23a is controlled so that HST motor shaft 26 is, when the HST mode, accelerated, and when the HST mode, decelerated (if it is rotated for rearward traveling, accelerated), thereby holding the output rotational speed of HMT 40, i.e., the rotational speed of first speed output shaft 27 so as to hold the traveling speed. On the contrary, for increasing engine rotational speed ER, speed ratio V is reduces as much, thereby holding the traveling speed.

Incidentally, a continuously variable transmission having an HST, as well as an HMT, can be controlled so as to change the speed ratio in correspondence to the variance of engine rotational speed in this manner.

As the above-mentioned embodiment in FIG. 9, if this control is adopted by a vehicle having a PTO shaft, and then, PTO shaft 42 is driven (i.e., PTO switch 57 is switched on so as to engage PTO clutch 41), the variance of engine rotational speed ER results in the variance of rotational speed of PTO shaft 42 (which is directly connected to input shaft 25 through PTO clutch 41 as mentioned above), thereby reducing the accuracy of work. At this time, the control of engine rotation according to the load control mode is not performed.

If the engine rotational speed as a result of its increase or decrease according to the load control mode, or the speed ratio as a result of its increase or decrease in association with the variance of engine rotational speed exceeds its permissible range, this control is broken. Then, the excessive engine rotational speed is returned to an engine rotational speed set by the accelerator, or the excessive speed ratio is returned to a speed ratio set by speed ratio setting lever 120. If the engine is under heavy load, a warning is given.

This control requires that the speed ratio set by speed ratio setting lever 120 is within a range for permission of main work (e.g., a speed ratio range wherein the traveling speed is less than 10 km/h while the engine is rotated at a rated speed. The maximum speed ratio of such a speed ratio range is hereinafter referred to as "Vw".). Especially, if the target speed ratio is set as shown in FIG. 15, if an operator drives the vehicle at the middle or high speed range without noticing that load control mode switch 56 is set on, the degree of speed ratio adjusted in correspondence to the variance of engine rotational speed basing on the detection of load is different from that in the low speed range (i.e., variance ratio $\Delta V$ of speed ratio is different between the two speed ratio ranges) so as to complicate the control, if the traveling speed is going to be still held. Also, while normal traveling, the frequency of load variance is less than that while traveling in the low speed range for permission of main work. Thus, the actual speed ratio range for control the engine rotational speed according to the load control mode is limited as the above.

Description will now be given on a flow of controlling the engine rotation basing on the detection of load ratio in accordance with FIGS. 23 and 24.

This control are performed when the following three conditional requirements are fulfilled:

First, speed ratio V set by speed ratio setting lever 120 is within the range for permission of main work (i.e., $V \leq Vw$). This is ascertained at a conditional branch 252 shown in FIG. 23.

Second, load control mode switch 56 is set on. This is ascertained at a conditional branch 253.

And third, PTO switch 57 is set on. This is ascertained at a conditional branch 254.

If even one of the three conditional requirements is decided to be not fulfilled at conditional branch 252, 253 or 254, engine rotational speed ER is controlled so as to agree with the rotational speed set by the accelerator (i.e., the rotational speed detected by accelerator sensor 59). Also, (at a process 268,) speed ratio V is held to be a value corresponding to the position of speed ratio setting lever 120 (i.e., a voltage detected by position sensor 120a).

If all the three conditional requirements are fulfilled (i.e., speed ratio V set by speed ratio setting lever 120 is within the range for permission of main work, load control mode switch 56 is set on, and PTO switch 57 is set on), the load control mode is established so that engine rotation controller 58 controls the engine rotational speed basing on detection of average engine load ratio L.

In detail, first, at a conditional branch 255, when such a condition that the traveling speed remains constant for not less than a predetermined time T1 (e.g., three seconds) is ascertained (a speed in a slight fluctuation, e.g., variance of speed between −0.5% and +0.5%, is regarded as a constant speed), it is decided at a conditional branch 256 whether average load ratio L of engine 24 is not more than a predetermined value L1 (e.g., 75%). When "$L \leq L1$" is ascertained, the timer is measured so as to decide (at a conditional branch 257) whether this constant speed condition is maintained for a predetermined time T2. If the timer does not pass the set time T2, the program is broken at an end 269 and starts from a start 251 so that the timer is further measured.

Thus, if the condition that average load ratio L is not more than predetermined load ratio L1 is maintained for not less than predetermined time T2 is ascertained, a process 258 is performed so that target engine rotational speed ER is determined to a value reduced from the pre-controlled value (in this embodiment, reduction at 5%, i.e., 95% preceding engine rotational speed ER), and target speed ratio V is increased at a certain degree from the pre-controlled value (in this embodiment, increase at 5%, i.e., 105% preceding engine rotational speed ER).

At a conditional branch 259, the condition that new target engine rotational speed ER is not less than the minimum allowable rotational speed ERL and new target speed ratio V is not more than the maximum allowable speed ratio $V_M$, the engine rotational speed is reduced and the speed ratio is increased so that they become new target values. In detail, controller 100 issues a command signal to engine rotational controller 58 so as to reduce the engine rotational speed. Simultaneously, since the HST mode is given in the speed ratio setting range for permission of main work, controller 100 issues a command signal to pump swash plate control device 121 so as to increase a slant angle of movable swash plate 22a (or to motor swash plate control device so as to decrease a slant angle of movable swash plate 23a), thereby increasing the relative capacity of HST 21 (the discharge amount of hydraulic pump 22 in relation to hydraulic motor 23), i.e., increasing the speed ratio, whereby the output rotational speed of HMT 40 (the rotational speed of first speed change output shaft 27) is held.

Hence, the engine rotational speed and the speed ratio are amended, and then the timer for measuring the detection time of the condition of light or heavy load on the engine is set to count (at a process 260), thereby preparing for the next loop.

When it is ascertained at conditional branch 259 the condition that target engine rotational speed ER is less than minimum rotational speed ERL or the condition that target speed ratio V is more than maximum speed ratio $V_M$, this amendment control is not performed. Then, a process 261 is performed so that the preceding target engine rotational speed and the preceding target speed ratio are maintained. In other words, if at the preceding loop, the engine rotational speed and the speed ratio are set correspondingly to the value set by the accelerator and the position of speed ratio setting lever 120 respectively, they are maintained. If the preceding loop is the amendment control loop corresponding to a light load condition, and then, in the running loop, the light load condition is detected, the preceding amended values are maintained.

On the other hand, if it is ascertained at conditional branch 256 that the engine is not light-loaded (i.e., average engine load ratio L is higher than L1), and at conditional branch 262 that the engine is excessively heavy-loaded (i.e., average engine load ratio L is not less than predetermined value L1, e.g., 95%), and further ascertained with measuring the timer at conditional branch 263 that this heavy load condition is maintained for not less than the predetermined time, a process 264 is performed so that the target engine rotational speed is set to a value increased at a certain degree from the pre-controlled value (in this embodiment, 105& preceding engine rotational speed ER) and the target speed ratio is set to a value decreased from the pre-controlled value (in this embodiment, 95% preceding speed ratio V).

At conditional branch 265, if it is ascertained that this new target engine rotational speed ER is not more than the maximum allowable rotational speed $ER_M$ and this new target speed ratio V is not less than the minimum allowable speed ratio $V_L$, the engine rotational speed is increased and the speed ratio is decreased so as to become these new target values. In detail, controller 100 issues a command signal to engine rotation controller 58 so as to increase the engine rotational speed, and issues a command signal to pump swash plate control device 121 so as to reduce the slant angle of movable swash plate 22a (or to motor swash plate control device 122 so as to increase the slant angle of movable swash plate 23a), thereby reducing the relative capacity of HST 21, i.e., reducing the speed ratio, whereby the output rotational speed of HMT 40 (the rotational speed of first speed change output shaft 27) is maintained.

Hence, the engine rotational speed and the speed ratio are amended and then the timer is reset (at a process 266), thereby preparing the next control loop.

At conditional branch 265, if it is ascertained that target engine rotational speed ER is more than the maximum allowable rotational speed $ER_M$ and target speed ratio V is less than the minimum allowable speed ratio $V_L$, this amendment is not performed and process 267 is performed so as to maintain the preceding target engine rotational speed and the preceding target speed ratio. In other words, if at the preceding loop, the engine rotational speed and the speed ratio are set correspondingly to the value set by the accelerator and the position of speed ratio setting lever 120 respectively, they are maintained. If the preceding loop is such an amendment control loop, and then, in the running loop, the excessively heavy load condition is still detected, the preceding amended values are maintained. Also, since the vehicle cannot escape from the excessive heavy load condition (i.e., the average engine load ratio remains not less than 95%), a warning is given (e.g., by an indicator or a buzzer).

At conditional branch 262, if it is ascertained that engine load ratio L is less than value L2, it means that engine load ratio L is more than L1 and less than L2. Thus, a process 268 is performed so that the actual engine rotational speed and the actual speed ratio are regulated so as to agree with target engine rotational speed ER set by the accelerator and essential target speed ratio V set by speed ratio setting lever 120.

Finally, description will be given on one embodiment of a vehicle equipped with HMT 40 and a control system for the vehicle in accordance with FIGS. 25–27.

Figure 25:
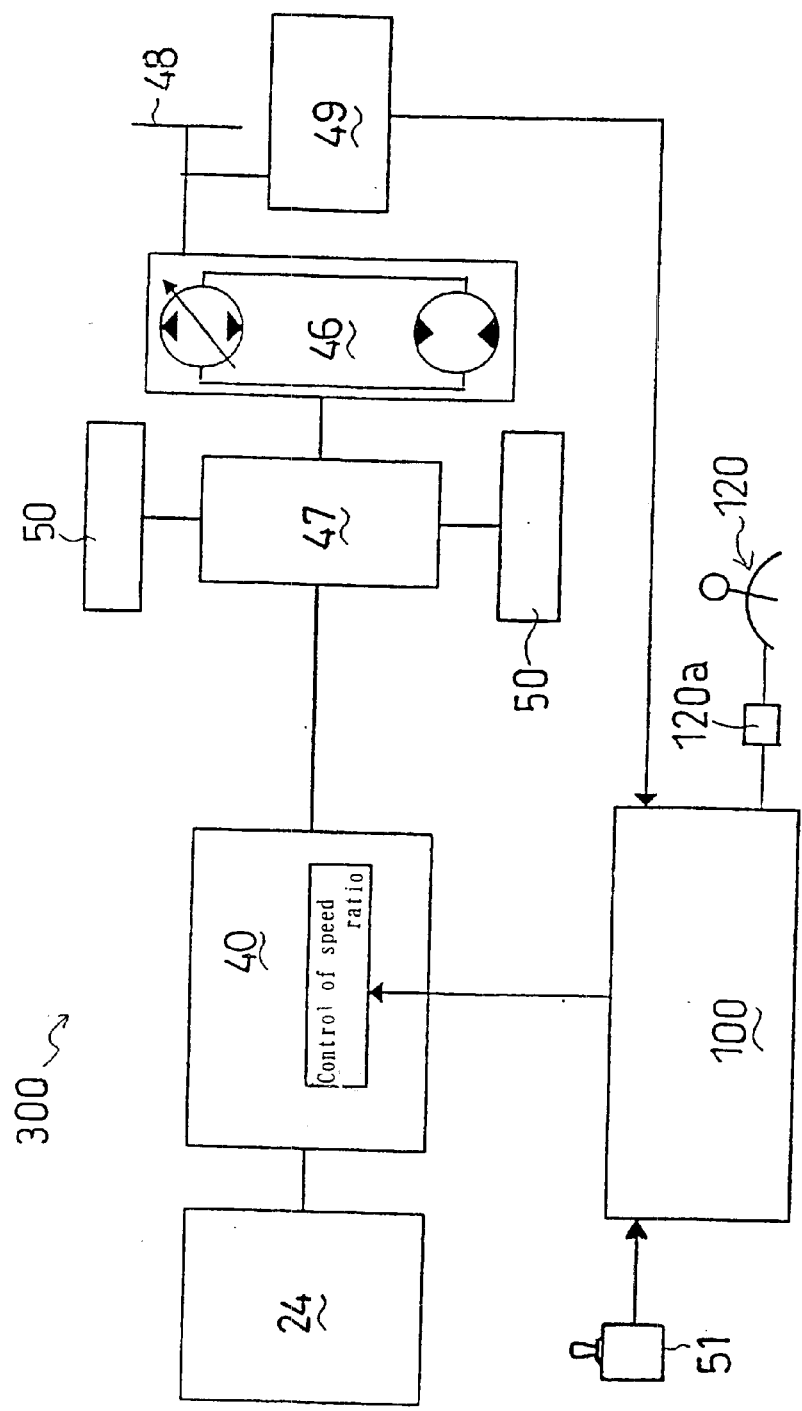
FIG. 25 is a block diagram of a vehicle 300 wherein HMT 40 is interlockingly connected with a steering HST 46.

Referring to FIG. 25, a vehicle 300 is provided with a crawler type traveling device. Driving power from engine 24 is input to HMT 40 of the present invention, speed-changed in HMT 40, and transmitted to left and right drive sprockets 50 through differential gear 47 so as to drive the crawler type traveling device.

Vehicle 300 is steered by rotational operation of a steering wheel 48. An output shaft of a hydraulic continuously variable transmission (hereinafter referred to as a "steering HST") 46 is drivingly connected to differential gear 47. The output shaft of steering HST 46 is varied in its rotational speed and rotational direction in correspondence to the rotational degree and direction of steering wheel 48.

Thus, left and right drive sprockets 50 driven by the power from HMT 40 through differential gear 47 is differentially rotated by the driving power from steering HST 46, thereby steering the vehicle.

In other words, the resultant of the driving power from HMT 40 for rotating left and right drive sprockets 50 in the same direction and the steering power from steering HST 46 for rotating left and right drive sprockets 50 in opposite directions makes left and right drive sprockets 50 different from each other.

The output rotation of HMT 40 is controlled by controller 100 into which the detection signal from position sensor 120a of speed ratio setting lever 120 is input.

A steering angle sensor 49 is connected to steering wheel 48 from which a detection signal is input into controller 100. In other words, the steering angle of steering wheel 48 is detected by steering angle sensor 49 and input into controller 100.

When speed ratio setting lever 120 is set at a stationary position (stationary position N as mentioned above), the driving power from HMT 40 is input into differential gear 47. Then, if steering wheel 48 is operated, only the power from steering HST 46 is input into differential gear 47 so that left and right drive sprockets 50 are rotated at the same speed in opposited directions, thereby making vehicle 300 spin-turn.

If speed ratio setting lever 120 is set out of stationary position N, the speed ratio corresponding to the position is established by controlling the output rotational speed of HMT 40 with controller 100. Then, if steering wheel 48 is at the stationary position, left and right drive sprockets 50 are rotated in the same rotational speed in correspondence to the speed ratio set by speed ratio setting lever 120. If steering wheel 48 is operated for left-or-right turning, the output rotation of steering HST 46 is set in correspondence to the degree and direction of rotated steering wheel 49 which is detected by steering sensor 49 so as to accelerate one drive sprocket 50 and decelerate the other drive sprocket 50, thereby making the vehicle turn left or right. As the rotational angle of steering wheel 48 is increased, the difference between left and right drive sprockets 50 is increased so as to reduce the turning circle of the vehicle.

This embodiment adopts such a manner that HMT 40 is also varied in its output rotational speed in correspondence to the rotational angle of steering wheel 48. In other words, the output rotational speed of HMT 40 is controlled so as to correspond to the speed ratio set by speed ratio setting lever 120 and to the detection by steering angle sensor 49.

Figure 26:
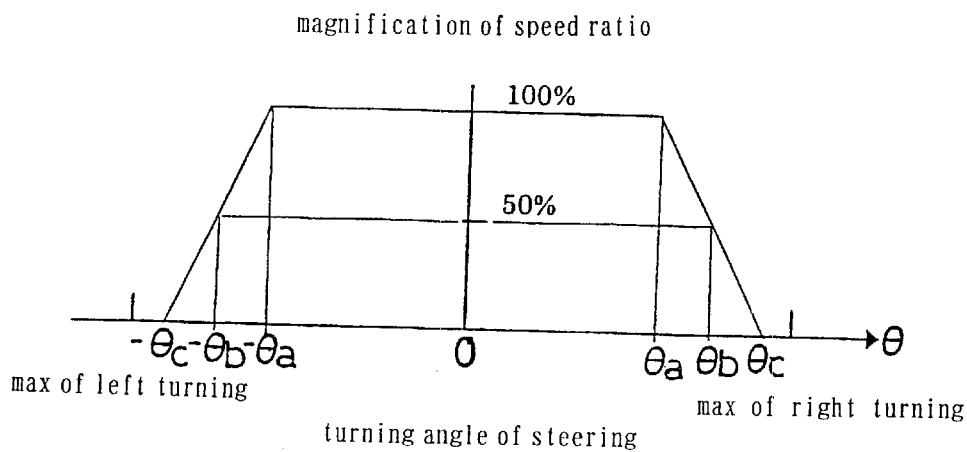
FIG. 26 is a graph of a magnification of speed ratio in relation to a turning angle of a steering wheel of vehicle 300.
Figure 27:
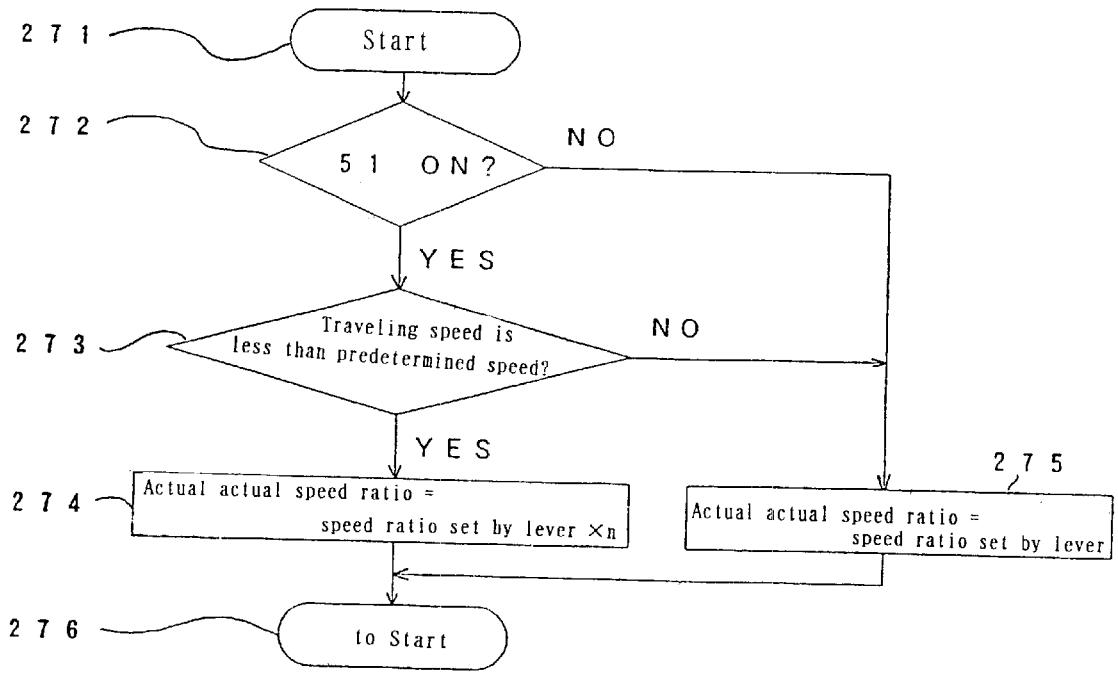
FIG. 27 is a flow chart of control of a speed ratio in association with steering of vehicle 300.

In this regard, as shown in FIG. 26, controller 100 determines a speed ratio magnification nX in correspondence to the rotational angle of steering wheel 48, i.e., a signal issued from steering angle sensor 49, and multiplies the present speed ratio set by speed ratio setting lever 120 by speed ratio magnification nX. Then, the output rotational speed of HMT 40 is controlled so as to establish the speed ratio as the result of this multiplication.

In the case that a left-or-right rotational angle θ of steering wheel 48 is not more than an angle θa (if steering wheel 48 is rotated for right turning, this value is positive. That is, $-\theta a \leq \theta \leq \theta a$), speed ratio magnification nX is 1X (i.e., 100%) so that the output rotational speed of HMT 40 corresponds to the speed ratio set by speed ratio setting lever 120. If the left-or-right rotational angle of steering wheel 48 is more than angle $\theta a$ (i.e., $\theta < -\theta a$, $\theta > \theta a$), speed ratio magnification nX is increased as the rotational angle is increased. For example, in correspondence to a rotational angle $\theta b$ of steering wheel 48, speed ratio magnification nX becomes 0.5 (i.e., 50%) so that the output rotational speed of HMT 40 becomes a half of that corresponding to the speed ratio set by speed ratio setting lever 120. Further, when the rotational angle thereof adjacent to the maximum rotational angle $\theta c$ is reached, speed ratio magnification nX becomes zeroX so that power is not transmitted from HMT 40 to differential gear 47, thereby making the vehicle spin-turn.

As a result of this control of speed ratio in correspondence to the steering angle, when the rotational angle of steering wheel 48 is increased from 0 to $\theta a$, the turning radius of vehicle 300 is decreased while the traveling speed thereof is maintained. When the rotational angle of steering wheel 48 is increased from $\theta a$ to $\theta c$, the turning radius of vehicle 300 is decreased while the traveling speed thereof is decreased, thereby being gradually brought into a condition like spin-turn. When the rotational angle of steering wheel 48 exceeds $\theta c$, vehicle 300 spin-turns. In other words, if steering wheel 48 is approximately fully rotated, vehicle 300 while traveling is naturally decelerated and brought into spin-turning without the trouble to put speed ratio setting lever 120 onto stationary position N.

Furthermore, as shown in FIG. 25, a spin-turn selection switch 51 is connected to controller 100. If spin-turn selection switch 51 is switched on, controller 100 performs a change of speed ratio basing on the determination of speed ratio in relation to the rotational angle of steering wheel 48 as shown in FIG. 26. If switched off, the output of HMT 40 is determined correspondingly to the speed ratio set by speed ratio setting lever 120 regardless of the operation of steering wheel 48. For example, when a combine as vehicle 300 is going to work on a farm attended with frequent turning on a butt, spin-turn selection switch 51 is switched on. If the combine is out of such a work, spin-turn selection switch 51 is switched off.

If vehicle 300 having this control system of speed ratio in correspondence to the steering angle, while traveling fast, is brought into nearly spin-turn by rotating steering wheel 48 to a great degree, the traveling speed and the turning radius thereof are simultaneously reduced, however, the ratio of deceleration is relatively increased because the rotational angle of steering wheel 48 and speed ratio magnification nX is constant. That is, vehicle 300 is suddenly decelerated so as to be unstable. Therefore, this output control system of HMT 40 is performed only when the traveling speed (i.e., the speed ratio set by speed ratio setting lever 120) is not more than a certain value.

A flow of this control system of speed ratio in correspondence to the rotational angle of steering wheel 48 will be described in accordance with FIG. 27. It is determined whether spin-turn selection switch 51 is on or off at a conditional branch 271. If spin-turn selection switch 51 is on, it is further determined whether the traveling speed of vehicle 300 is more than a predetermined value or not. If the traveling speed of vehicle 300 is not more than the predetermined value, speed ratio V determined by speed ratio setting lever 120 is multiplied by speed ratio magnification nX in correspondence to the voltage issued from steering angle sensor 49. Then, HMT 40 is controlled in its output rotational speed according to this multiplied speed ratio.

If spin-turn selection switch 51 is determined to be off at conditional branch 271, and then, vehicle 300 is determined to be more than the predetermined value, a process 274 is performed so as to control the output speed rotational speed of HMT 40 according to the speed ratio as itself set by speed ratio setting lever 120.

Incidentally, this control system of speed ratio in correspondence to steering operation is applicable to a continuously variable transmission consisting of only an HST, as well as an HMT.

Possibility of Industrial Application

The continuously variable transmission of the present invention like a hydraulic and mechanical composite transmission (an HMT), which includes a hydraulic continuously variable transmission mechanism is applicable to a vehicle especially designed to establish a continuous variation of speed in the whole range for determining a speed ratio, e.g. a working vehicle like a tractor or a combine. If an HMT is applied as the present invention, it can establish tough traveling with high torque in a low speed range by using its HST, and establish high traveling speed, which is hard to be provided by the HST with an engine in a small scale of output, by the mechanical transmission mechanism of the differential part of a planetary gear type, thereby greatly contributing to providing a vehicle which, while having a small engine, can travel at high speed.

What is claimed is:

1. A continuously variable transmission comprising:
    a speed change input part for receiving power from a prime mover;
    a speed change output part;
    a hydraulic continuously variable transmission mechanism interposed between said speed change input part and said speed change output part;
    a hydraulic pump and a hydraulic motor fluidly connected with each other so as to constitute said hydraulic continuously variable transmission mechanism;
    a mechanical speed change mechanism interposed between said speed change input part and said speed change output part;
    a differential part included by said mechanical speed change mechanism;
    a group of planetary gears constituting said differential part;
    a first differential input shaft constituting said differential part, wherein a rotational force of said speed change input part is transmitted into both said first differential input shaft and said hydraulic pump;
    a first sun gear constituting said first differential input shaft, said first sun gear being outer-peripherally toothed so as to engage with said group of planetary gears;
    a second sun gear constituting said second differential input part, said second sun gear being rotatably provided around a shaft of said first Sun gear and outer-peripherally toothed so as to engage with said group of planetary gears;
    a second differential input part constituting said differential part, said second differential input part receiving a rotational force of said hydraulic motor, wherein a rotation of said group of planetary gears generated by a difference between said first differential input shaft and said second differential input part can be transmitted to said speed change output part;

a pump shaft constituting said hydraulic pump, wherein said speed change input part is formed on one end side of said pump shaft, and wherein said first differential input shaft is coaxially formed on the other side of said pump shaft so as to be extended and connected with a PTO shaft, and wherein said pump shaft is extended so as to serve as said first differential input shaft.

2. A continuously variable transmission comprising:

a speed change input part for receiving power from a prime mover;

a speed change output part;

a hydraulic continuously variable transmission mechanism interposed between said speed change input part and said speed change output part;

a hydraulic pump and a hydraulic motor fluidly connected with each other so as to constitute said hydraulic continuously variable transmission mechanism;

a mechanical speed change mechanism interposed between said speed change input part and said speed change output part;

a differential part included by said mechanical speed change mechanism;

a group of planetary gears constituting said differential part;

a first differential input part constituting said differential part, wherein a rotational force of said speed change input part is transmitted into both said first differential input part and said hydraulic pump;

a second differential input part constituting said differential part, said second differential input part receiving a rotational force of said hydraulic motor;

a first drive train constituting said mechanical speed change mechanism from said hydraulic motor to said second differential input part;

a second drive train constituting said mechanical speed change mechanism for transmitting a rotation of said group of planetary gears generated by a difference in rotation between said first differential input part and said second differential input part to said speed output part; and a third drive train constituting said mechanical speed change mechanism for transmitting a rotation of said hydraulic motor to said speed change output part without passing said differential part, wherein a transmission mode of said continuously variable transmission is selectively placed into either a first transmission mode for transmitting the rotation of said hydraulic motor to said speed change output part through said third drive train while said third drive train being isolated or a second transmission mode for transmitting said speed change output part through said first drive train, said differential part and said second drive train while said third drive train being isolated;

wherein, referring to a rotational speed ratio of said speed change output part to said speed change input part as a speed ratio, said speed ratio is changed by regulating a discharge of said hydraulic pump or said hydraulic motor, and wherein, during an operation for varying said speed ratio, said transmission mode is changed at a timing when a rotational speed of said group of planetary gears which, if said first transmission mode being set, run idle through said second drive train by the rotation of said speed change output part substantially coincides with a rotational speed of said group of planetary gears if said second transmission mode being set.

3. The continuously variable transmission as set forth in claim 2, wherein said transmission mode is changed at a certain speed ratio in forward traveling referred to as a transmission mode change speed ratio wherein said first transmission mode is set when a set speed ratio for forward traveling is less than said transmission mode change speed ratio or when any speed ratio for rearward traveling is set, and wherein said second transmission mode is set when said set speed ratio for forward traveling is not less than said transmission mode change speed ratio.

4. The continuously variable transmission as set forth in claim 3, further comprising:

a fourth drive train for transmitting power from said speed change input part to said speed change output part through neither said hydraulic continuously variable transmission nor said differential part, said fourth drive train is isolated when said continuously variable transmission is placed into either said first or second transmission mode, wherein said continuously variable transmission can be placed into a third transmission mode so that said first and second drive trains are isolated and power from said speed change input part is transmitted to said speed change output part through said fourth drive train, and wherein when said speed ratio for forward traveling is set at the maximum, the rotational speed of said speed change output part becomes substantially the same whether it is generated by said second transmission mode or said third transmission mode, and then, said second transmission mode and said third transmission mode are exchanged for each other.

5. The continuously variable transmission as set forth in claim 4, further comprising:

a detection means for detecting a rotational speed of said prime mover, wherein said third transmission mode can be selected only when the rotational speed of said prime mover detected at a timing for changing said transmission mode between said second transmission mode and said third transmission mode is between that corresponding to the maximum torque of said prime mover and that corresponding to the maximum output power of said prime mover.

6. The continuously variable transmission as set forth in claim 2, further comprising:

a clutch for changing said transmission mode;

a speed ratio setting means manipulated by an operator for setting a target speed ratio, wherein said hydraulic pump or said hydraulic motor is regulated in its discharge so as to make an actual speed ratio agree with said target speed ratio, and wherein a time lag between detection of said target speed ratio and completion of changing said transmission mode during the change of speed ratio by said speed ratio setting means is computed, and then said timing for changing said transmission mode is advanced as much as said computed time lag.

7. The continuously variable transmission as set forth in claim 6, wherein, referring to a speed ratio corresponding to said timing for changing said transmission mode as a transmission-mode-change speed ratio, said target speed ratio is continuously detected and a simulated target speed ratio is simulated when said time lag passes from each period of detecting said target speed ratio, said simulated target speed ratio is compared with said transmission-mode-change speed ratio, and wherein said clutch is switched so as to change said transmission mode when said simulated target speed ratio becomes said transmission-mode-change speed ratio.

8. The continuously variable transmission as set forth in claim 2, further comprising:

a clutch for changing said transmission mode; and a brake provided on said speed change output part, wherein, when said brake is going to be operated for braking, said clutch which has been engaged is disengaged so that all said clutches become disengaged.

9. The continuously variable transmission as set forth in claim 8, wherein, when said brake is released from said braking condition, said hydraulic pump or said hydraulic motor is controlled in its discharge so as to make an actual speed ratio agree with a set speed ratio, and then, said clutch which has been disengaged on braking is engaged so as to revive said transmission mode before said braking.

10. A continuously variable transmission comprising:

a hydraulic continuously variable transmission mechanism including a variable displacement hydraulic pump and a variable displacement hydraulic motor fluidly connected with each other;

a speed ratio setting means manipulated by an operator, referring to an output/input ratio in rotational speed as a speed ratio, and referring to a speed ratio set by said speed ratio setting means as a target speed ratio, wherein said hydraulic pump or said hydraulic motor is controlled in its discharge so as to make an actual speed ratio agree with said target speed ratio;

a range of said speed ratio to be set by said speed ratio setting means;

a pump control zone provided in said range of said speed ratio for controlling only the discharge of said hydraulic pump; and a motor control zone provided in said range of said speed ratio for controlling only the discharge of said hydraulic motor, said motor control zone being continuous to said pump control zone, wherein when a boundary between said pump control zone and said motor control zone is between an actual speed ratio and said target speed ratio, both said hydraulic pump and said hydraulic motor are simultaneously varied in their discharge.

11. The continuously variable transmission as set forth in claim 10, further comprising:

a speed change input part;

a speed change output part;

a mechanical speed change mechanism, said mechanical speed change mechanism and said hydraulic continuously variable transmission mechanism being interposed between said speed change input part and said speed change output part;

a differential part included by said mechanical speed change mechanism;

a group of planetary gears constituting said differential part;

a first differential input part constituting said differential part, wherein a rotational force of said speed change input part is transmitted into both said first differential input part and said hydraulic pump; and a second differential input part constituting said differential part, said second differential input part receiving a rotational force of said hydraulic motor, wherein a rotation of said group of planetary gears generated by a difference in rotation between said first differential input part and said second differential input part is transmitted to said speed output part, wherein said continuously variable transmission can be placed in either a first transmission mode for transmitting the rotation of said hydraulic motor to said speed change output part without passing said differential part or a second transmission mode for transmitting the rotation of said hydraulic motor to said speed change output part, and wherein said first and second transmission modes are exchanged for each other when a certain speed ratio is set by said speed ratio setting means.

12. The continuously variable transmission as set forth in claim 11, further comprising:

an additional drive train for transmitting power from said speed change input part to said speed change output part through neither said hydraulic continuously variable transmission mechanism nor said differential part, wherein, at a certain determined speed ratio, said first and second drive trains are isolated so as to place said continuously variable transmission into a third transmission mode for transmitting power from said speed change input part to said speed change output part through said additional drive train, and wherein, when said continuously variable transmission is placed in said first transmission mode or said second transmission mode, said additional drive train is isolated.

13. The continuously variable transmission as set forth in claim 11, wherein, when a speed ratio is set to a value corresponding to changing either said first or second transmission mode of said continuously variable transmission, and then a boundary between said pump control zone and said motor control zone is between an actual speed ratio and said speed ratio corresponding to changing said first or second transmission mode, said speed ratio corresponding to said first or second transmission mode is defined as a provisional target speed ratio, either said hydraulic pump or said hydraulic motor is varied in its discharge so as to adjust said actual speed ratio to said provisional target speed ratio, and afterward, both said hydraulic pump and said hydraulic motor are simultaneously varied in their discharge.

14. The continuously variable transmission as set forth in claim 10, wherein, when said actual speed ratio is different from a speed ratio set by said speed ratio setting means, said hydraulic pump is regulated in its discharge, and then, if said hydraulic pump reaches its maximum, said hydraulic motor is regulated in its discharge, thereby adjusting said actual speed ratio to said set speed ratio.

15. The continuously variable transmission as set forth in claim 14, further comprising:

a speed change input part;

a speed change output part;

a mechanical speed change mechanism, said hydraulic continuously variable transmission and said mechanical speed change mechanism being interposed between said speed change input part and said speed change output part;

a differential part included by said mechanical speed change mechanism;

a group of planetary gears constituting said differential part;

a first differential input part constituting said differential part, a rotational speed of said speed change input part being transmitted to both said first differential input part and said hydraulic pump; and a second differential input part constituting said differential part, a rotational speed of said hydraulic motor being transmitted to said second differential input part, wherein a rotational speed of said group of planetary gears generated by a difference between said first differential input part and said second differential input part can be transmitted into said speed change output part.

16. A continuously variable transmission comprising:

a speed change input part for receiving power from a prime mover;

a speed change output part;

a hydraulic continuously variable transmission mechanism interposed between said speed change input part and said speed change output part;

a hydraulic pump and a hydraulic motor fluidly connected with each other so as to constitute said hydraulic continuously variable transmission mechanism;

a mechanical speed change mechanism interposed between said speed change input part and said speed change output part;

a differential part included by said mechanical speed change mechanism;

a group of planetary gears constituting said differential part;

a first differential input part constituting said differential part, wherein a rotational force of said speed change input part is transmitted into both said first differential input part and said hydraulic pump;

a second differential input part constituting said differential part, said second differential input part receiving a rotational force of said hydraulic motor, wherein a rotation of said group of planetary gears generated by a rotational difference between said first differential input part and said second differential input part can be transmitted to said speed output part, wherein said continuously variable transmission is placed in either a first transmission mode for transmitting a rotational power of said hydraulic motor to said speed change output part without passing said differential part or a second transmission mode for transmitting a rotational power of said group of planetary gears to said speed change output part, wherein, when a certain speed ratio is set, said first and second transmission modes are exchanged for each other; and a speed ratio setting means manipulated by an operator so as to set a speed ratio referred to as a target speed ratio, said continuously variable transmission being controlled so as to adjust an actual speed ratio to said target speed ratio, wherein said transmission modes are exchanged only when said actual speed ratio is varied across said speed ratio corresponding to exchanging said transmission modes and this variation of said actual speed ratio is established really by manipulating said speed ratio setting means.

17. The continuously variable transmission as set forth in claim 16, further comprising:

an additional drive train for transmitting power from said speed change input part to said speed change output part through neither said hydraulic continuously variable transmission mechanism nor said differential part, wherein, at a certain determined speed ratio, said first and second drive trains are isolated so as to place said continuously variable transmission into a third transmission mode for transmitting power from said speed change input part to said speed change output part through said additional drive train, wherein said additional drive train is isolated when said continuously variable transmission is placed in said first transmission mode or said second transmission mode, and wherein said speed ratio corresponding exchanging said transmission modes includes a speed ratio corresponding to exchanging another transmission mode for said third transmission mode.

18. The continuously variable transmission as set forth in claim 16, wherein a variation ratio of said target speed ratio to a unit shift degree of said speed ratio setting means is changed in correspondence to a position of said speed ratio setting means.

19. The continuously variable transmission as set forth in claim 18, wherein said variation ratio of said target speed ratio is reduced in a range for setting smaller speed ratio and is increased in a range for setting larger speed ratio.

20. A continuously variable transmission comprising:

a hydraulic pump;

a hydraulic motor fluidly connected with said hydraulic pump;

a hydraulic continuously variable transmission mechanism constituted by said hydraulic pump and said hydraulic motor; and a speed ratio setting means manually shifted by an operator, wherein referring to an output/input rotational speed ratio of said continuously variable transmission as a speed ratio, and defining said speed ratio determined by detecting a position of said speed ratio setting means as a target speed ratio, said hydraulic pump or said hydraulic motor is controlled in its discharge so as to adjust an actual speed ratio to said target speed ratio, wherein a shift speed of said speed ratio setting means is computed, wherein an actual speed ratio corresponding to a detected real position of said speed ratio setting means is amended correspondingly to said actual speed ratio and said shift speed so as to be defined as a provisional speed ratio, and wherein said hydraulic pump or said hydraulic motor is controlled in discharge so as to adjust said actual speed ratio to said provisional speed ratio.

21. The continuously variable transmission as set forth in claim 20, further comprising:

a speed change input part;

a speed change output part;

a mechanical speed change mechanism, said mechanical speed change mechanism and said continuously variable transmission mechanism being interposed between said speed change input part and said speed change output part;

a differential part included by said mechanical speed change mechanism;

a group of planetary gears constituting said differential part;

a first differential input part constituting said differential part, a rotation of said speed change input part being transmitted to both said first differential input part and said hydraulic pump; and a second differential input part constituting said differential part, a rotation of said hydraulic motor being transmitted to said second differential input part, wherein a rotation of said group of planetary gears generated by a difference in rotation between said first and second differential input parts can be transmitted to said speed change output part.

22. A continuously variable transmission comprising:

a hydraulic pump;

a hydraulic motor fluidly connected with said hydraulic pump;

a hydraulic continuously variable transmission mechanism constituted by said hydraulic pump and said hydraulic motor; and a speed ratio setting means manually shifted by an operator, wherein referring to an output/input rotational speed ratio of said continuously variable transmission as a speed ratio, and defining said speed ratio determined by detecting a position of said speed ratio setting means as a target speed ratio, said hydraulic pump or said hydraulic motor is controlled in its discharge so as to adjust an actual speed ratio to said target speed ratio, wherein if an actual speed ratio belongs to an extremely low speed range in whether forward traveling or rearward traveling while said target speed ratio set by said speed ratio setting means is 0, said target speed ratio is amended so as to reverse the actual rotational direction of said hydraulic motor into the opposite direction.

23. The continuously variable transmission as set forth in claim 22, further comprising:

movable swash plates as discharge regulating means for said respective hydraulic pump and motor, wherein said target speed ratio is amended at a value corresponding to the minimum tilt angle of said movable swash plate of said hydraulic pump or said hydraulic motor.

24. The continuously variable transmission as set forth in claim 23, further comprising:

a speed change input part;

a speed change output part;

a mechanical speed change mechanism, said mechanical speed change mechanism and said continuously variable transmission mechanism being interposed between said speed change input part and said speed change output part;

a differential part included by said mechanical speed change mechanism;

a group of planetary gears constituting said differential part;

a first differential input part constituting said differential part, a rotation of said speed change input part being transmitted to both said first differential input part and said hydraulic pump; and a second differential input part constituting said differential part, a rotation of said hydraulic motor being transmitted to said second differential input part, wherein a rotation of said group of planetary gears generated by a difference in rotation between said first and second differential input parts can be transmitted to said speed change output part.

25. A continuously variable transmission comprising:

a speed change input part of said continuously variable transmission, output power of a prime mover being transmitted to said speed change input part;

a hydraulic pump;

a hydraulic motor fluidly connected with said hydraulic pump;

a hydraulic continuously variable transmission mechanism constituted by said hydraulic pump and said hydraulic motor; and a speed ratio setting means manually shifted by an operator, wherein referring to an output/input rotational speed ratio of said continuously variable transmission as a speed ratio, and defining said speed ratio determined by detecting a position of said speed ratio setting means as a target speed ratio, said hydraulic pump or said hydraulic motor is controlled in its discharge so as to adjust an actual speed ratio to said target speed ratio, wherein said continuously variable transmission is interlockingly connected with a prime mover rotation control means for controlling said output power of said prime mover, which can be placed into a load control mode for varying an output rotational speed of said prime mover in correspondence to a detected magnitude of load applied on said prime mover, so that, when the rotational speed of said prime mover is varied in correspondence to the load on said prime mover by said prime mover rotation control means placed in said load control mode, an actual speed ratio is controlled by said continuously variable transmission so as to achieve a set traveling speed.

26. The continuously variable transmission as set forth in claim 25, further comprising:

an PTO part rotated synchronously to said speed change input part, wherein said prime mover rotation control means can be placed into said load control mode for controlling the output rotation of said prime mover only when power is not transmitted to said PTO part.

27. The continuously variable transmission as set forth in claim 25, further comprising:

a speed change output part;

a mechanical speed change mechanism, said mechanical speed change mechanism and said continuously variable transmission mechanism being interposed between said speed change input part and said speed change output part;

a differential part included by said mechanical speed change mechanism;

a group of planetary gears constituting said differential part;

a first differential input part constituting said differential part, a rotation of said speed change input part being transmitted to both said first differential input part and said hydraulic pump; and a second differential input part constituting said differential part, a rotation of said hydraulic motor being transmitted to said second differential input part, wherein a rotation of said group of planetary gears generated by a difference in rotation between said first and second differential input parts can be transmitted to said speed change output part.

28. A continuously variable transmission comprising:

a speed change output part;

a hydraulic continuously variable transmission mechanism;

a hydraulic pump and a hydraulic motor fluidly connected with said hydraulic pump so as to constitute said hydraulic continuously variable transmission mechanism; and a speed ratio setting means manually shifted by an operator, wherein referring to an output/input rotational speed ratio of said continuously variable transmission as a speed ratio, and defining said speed ratio determined by detecting a position of said speed ratio setting means as a target speed ratio, said hydraulic pump or said hydraulic motor is controlled in its discharge so as to adjust an actual speed ratio to said target speed ratio, wherein said continuously variable transmission is mounted on a vehicle provided with a pair of drive axles, an axle differential unit differentially connecting said drive axles, a steering operation means, and a rotary means which is varied in its rotational speed in its normal and reverse directions in correspondence to the operational direction and degree of said steering operation means, so that the rotation of said speed change output part and the rotation of said rotary means are transmitted into said axle differential unit so as to differentially drive said pair of drive axles thereby making said vehicle turn left and right, wherein said speed ratio established in said continuously variable transmission is controlled so as to be reduced according to increase of operational degree of said steering operation means, and wherein when said steering operation means is operated adjacent to its maximum operational degree, the rotation of said speed change output part is stopped.

29. The continuously variable transmission as set forth in claim 28, wherein said control of speed ratio in correspondence to the steering operational degree in said continuously variable transmission is not performed unless the traveling speed of said vehicle is less than a certain traveling speed.

30. The continuously variable transmission as set forth in claim 28, wherein whether or not said control of speed ratio in correspondence to the steering operational degree in said continuously variable transmission is performed may be decided.

31. A continuously variable transmission comprising:
a speed change input part for receiving power from a prime mover;
a speed change output part, wherein a speed ratio is defined as a ratio of said speed change output part to said speed change input part;
a hydraulic continuously variable transmission mechanism interposed between said speed change input part and said speed change output part;
a hydraulic pump and a hydraulic motor fluidly connected with each other so as to constitute said hydraulic continuously variable transmission mechanism;
a mechanical speed change mechanism interposed between said speed change input part and said speed change output part;
a differential part included by said mechanical speed change mechanism;
a group of planetary gears constituting said differential part;
a first differential input part constituting said differential part, wherein a rotational force of said speed change input part is transmitted into both said first differential input part and said hydraulic pump;
a second differential input part constituting said differential part, said second differential input part receiving a rotational force of said hydraulic motor, wherein a rotation of said group of planetary gears generated by a rotational difference between said first differential input part and said second differential input part can be transmitted to said speed output part;
an additional drive train for transmitting said rotation of said speed change input part to said speed change output part without passing said hydraulic pump and said differential part;
a speed ratio setting means for setting a target speed ratio, wherein an actual speed ratio is adjusted to said target speed ratio by controlling said hydraulic pump or said hydraulic motor in its discharge, and
wherein, when the maximum allowable speed ratio to be set or a speed ratio value adjacent to the maximum is set by said speed ratio setting means, power is transmitted with said additional drive train;
a detection means for detecting a rotational speed of said prime mover,
wherein a transmission mode using said additional drive train is selected only when the rotational speed of said prime mover detected by said detection means at a timing for selecting said transmission mode using said additional drive train is within or adjacent to a range between that of said prime mover corresponding to the maximum torque of said prime mover and that of said prime mover corresponding to the maximum output power of said prime mover, and
wherein unless it is a timing for choosing the transmission with said additional drive train comes and then said detection means detects that said rotational speed of said prime mover is within or in the vicinity of a range between a value corresponding to the maximum torque of said prime mover and a value corresponding to the maximum output power of said prime mover, said additional drive train cannot be chosen.

* * * * *